(12) United States Patent
Yamazoe et al.

(10) Patent No.: US 10,676,919 B2
(45) Date of Patent: Jun. 9, 2020

(54) SOUNDPROOF STRUCTURE, LOUVER, AND PARTITION

(71) Applicant: FUJIFILM Corporation, Tokyo (JP)

(72) Inventors: Shogo Yamazoe, Ashigara-kami-gun (JP); Shinya Hakuta, Ashigara-kami-gun (JP); Tadashi Kasamatsu, Ashigara-kami-gun (JP); Masayuki Naya, Ashigara-kami-gun (JP)

(73) Assignee: FUJIFILM Corporation, Tokyo (JP)

( * ) Notice: Subject to any disclaimer, the term of this patent is extended or adjusted under 35 U.S.C. 154(b) by 335 days.

(21) Appl. No.: 15/794,955

(22) Filed: Oct. 26, 2017

(65) Prior Publication Data

US 2018/0058066 A1      Mar. 1, 2018

Related U.S. Application Data

(63) Continuation of application No. PCT/JP2016/068109, filed on Jun. 17, 2016.

(30) Foreign Application Priority Data

Jun. 22, 2015   (JP) .................................. 2015-124632
Apr. 28, 2016   (JP) .................................. 2016-090581

(51) Int. Cl.
*E04B 1/82*      (2006.01)
*G10K 11/172*    (2006.01)
(Continued)

(52) U.S. Cl.
CPC .............. *E04B 1/8209* (2013.01); *E04B 1/86* (2013.01); *E04B 2/74* (2013.01); *G10K 11/16* (2013.01); *G10K 11/172* (2013.01); *G03B 21/22* (2013.01)

(58) Field of Classification Search
CPC ........... G10K 11/172; E04B 2001/8433; E04B 1/8209; G03B 21/22
(Continued)

(56) References Cited

U.S. PATENT DOCUMENTS 4,265,955 A       5/1981   Harp et al.
6,977,109 B1 *   12/2005   Wood ..................... G10K 11/16
                                                              181/292

(Continued)

FOREIGN PATENT DOCUMENTS

JP     54-144488 A    11/1979
JP      4-147199 A     5/1992
(Continued)

OTHER PUBLICATIONS

International Preliminary Report on Patentability and Written Opinion of the International Searching Authority (Forms PCT/IB/326, PCT/IB/373 and PCT/ISA/237) for Application No. PCT/JP2016/068109, dated Jan. 4, 2018, with an English translation.

(Continued)

*Primary Examiner* — Jeremy A Luks
(74) *Attorney, Agent, or Firm* — Birch, Stewart, Kolasch & Birch, LLP

(57) ABSTRACT

Two or more soundproof cells arranged in a two-dimensional manner are provided. At least one of the soundproof cells is a first soundproof cell configured to include a first frame having a first through-hole. At least one of the other soundproof cells is a second soundproof cell including a second frame having a second through-hole and a film fixed to the second frame. A first shielding peak frequency, which is determined by the first through-hole of the first soundproof cell and at which a transmission loss is maximized, is present on a lower frequency side than a first natural vibration frequency of the film of the second soundproof (Continued)

cell, and sound in a predetermined frequency band centered on the first shielding peak frequency is selectively insulated.

11 Claims, 20 Drawing Sheets

(51) Int. Cl.
    *G03B 21/22* (2006.01)
    *E04B 1/86* (2006.01)
    *E04B 2/74* (2006.01)
    *G10K 11/16* (2006.01)

(58) Field of Classification Search
    USPC .................................................. 181/291, 293
    See application file for complete search history.

(56) References Cited

U.S. PATENT DOCUMENTS

| | | | |
|---|---|---|---|
| 7,395,898 B2 | 7/2008 | Yang et al. | |
| 8,109,361 B2* | 2/2012 | Tsugihashi | F04B 39/0027 181/207 |
| 8,371,419 B2* | 2/2013 | Nonogi | B32B 7/14 181/290 |
| 8,469,145 B2* | 6/2013 | Nonogi | B32B 3/266 181/291 |
| 8,869,933 B1* | 10/2014 | McKnight | G10K 11/172 181/207 |
| 2006/0035058 A1 | 2/2006 | Ogawa et al. | |
| 2006/0289229 A1* | 12/2006 | Yamaguchi | G10K 11/172 181/290 |
| 2009/0084627 A1* | 4/2009 | Tsugihashi | B60J 5/00 181/290 |
| 2009/0223738 A1* | 9/2009 | Nakamura | G10K 11/172 181/175 |
| 2011/0100749 A1* | 5/2011 | Nonogi | B32B 3/266 181/291 |
| 2011/0240402 A1* | 10/2011 | Chou | F16F 7/104 181/207 |
| 2014/0371698 A1* | 12/2014 | Chang | A61F 5/445 604/333 |

FOREIGN PATENT DOCUMENTS

| | | |
|---|---|---|
| JP | 2000-56777 A | 2/2000 |
| JP | 2004-160963 A | 6/2004 |
| JP | 2004-170584 A | 6/2004 |
| JP | 2005-250474 A | 9/2005 |
| JP | 4832245 B2 | 12/2011 |

OTHER PUBLICATIONS

International Search Report and English translation (Form PCT/ISA/210) for Application No. PCT/JP2016/068109, dated Sep. 6, 2016.

* cited by examiner

SOUNDPROOF STRUCTURE, LOUVER, AND PARTITION

CROSS-REFERENCE TO RELATED APPLICATIONS

This application is a Continuation of PCT International Application No. PCT/JP2016/068109 filed on Jun. 17, 2016, which claims priority under 35 U.S.C. § 119(a) to Japanese Patent Application No. 2015-124632 filed on Jun. 22, 2015 and Japanese Patent Application No. 2016-090581 filed on Apr. 28, 2016. Each of the above applications is hereby expressly incorporated by reference, in its entirety, into the present application.

BACKGROUND OF THE INVENTION

1. Field of the Invention

The present invention relates to a soundproof structure and a louver and a partition using the same.

2. Description of the Related Art

In the case of a general sound insulation material, as the mass increases, the sound more effectively shielded. Accordingly, in order to obtain a good sound insulation effect, the sound insulation material itself becomes large and heavy. On the other hand, in particular, it is difficult to shield the sound of low frequency components. In general, this region is called a mass law, and it is known that the shielding increases by 6 dB in a case where the frequency doubles.

Thus, most of the conventional soundproof structures are disadvantageous in that the soundproof structures are large and heavy due to sound insulation by the mass of the structures and that it is difficult to shield low frequencies.

For this reason, as a sound insulation material corresponding to various situations, such as equipment, automobiles, and general households, a light and thin sound insulation structure has been demanded. In recent years, therefore, a sound insulation structure for controlling the vibration of a film by attaching a frame to a thin and light film structure has been drawing attention (refer to JP4832245B and U.S. Pat. No. 7,395,898B (corresponding Japanese Patent Application Publication: JP2005-250474A).

In the case of these structures, the principle of sound insulation is a stiffness law different from the mass law described above. Accordingly, low frequency components can be further shielded even with a thin structure. This region is called a stiffness law, and the behavior is the same as in a case where a film has a finite size matching a frame opening portion since the film vibration is fixed at the frame portion.

JP4832245B discloses a sound absorber that has a frame body, which has a through-hole formed therein, and a sound absorbing material, which covers one opening of the through-hole and whose first storage modulus E1 is $9.7 \times 10^6$ or more and second storage modulus E2 is 346 or less (refer to abstract, claim 1, paragraphs [0005] to [0007] and [0034], and the like). The storage modulus of the sound absorbing material means a component, which is internally stored, of the energy generated in the sound absorbing material by sound absorption.

In JP4832245B, in the embodiment, by using a sound absorbing material containing a resin or a mixture of a resin and a filler as a mixing material, it is possible to obtain the peak value of the sound absorption rate in the range of 0.5 to 1.0 and the peak frequency in the range of 290 to 500 Hz and to achieve a high sound absorption effect in a low frequency region of 500 Hz or less without causing an increase in the size of the sound absorber.

In addition, U.S. Pat. No. 7,395,898B (corresponding Japanese Patent Application Publication: JP2005-250474A) discloses a sound attenuation panel including an acoustically transparent two-dimensional rigid frame divided into a plurality of individual cells, a sheet of flexible material fixed to the rigid frame, and a plurality of weights, and a sound attenuation structure (refer to claims 1, 12, and 15, FIG. 4, page 4, and the like). In the sound attenuation panel, the plurality of individual cells are approximately two-dimensional cells, each weight is fixed to the sheet of flexible material so that the weight is provided in each cell, and the resonance frequency of the sound attenuation panel is defined by the two-dimensional shape of each cell individual cell, the flexibility of the flexible material, and each weight thereon.

U.S. Pat. No. 7,395,898B (corresponding Japanese Patent Application Publication: JP2005-250474A) discloses that the sound attenuation panel has the following advantages compared with the related art. That is, (1) the sound attenuation panel can be made very thin. (2) The sound attenuation panel can be made very light (with a low density). (3) The panel can be laminated together to form a wide-frequency range local resonance sound material (LRSM) since the panel does not follow the mass law over a wide frequency range, and in particular, this can deviate from the mass law at frequencies lower than 500 Hz. (4) The panel can be easily and inexpensively manufactured (refer to page 5, line 65 to page 6, line 5).

SUMMARY OF THE INVENTION

Incidentally, since the sound absorber disclosed in JP4832245B is light and the peak value of the sound absorption rate is as high as 0.5 or more, it is possible to achieve a high sound absorption effect in a low frequency region where the peak frequency is 500 Hz or less. However, there has been a problem that the range of selection of a sound absorbing material is narrow and accordingly it is difficult to achieve the high sound absorption effect in a low frequency region.

Since the sound absorbing material of such a sound absorber completely blocks the through-hole of the frame body, the sound absorbing material does not allow wind or heat to pass therethrough and accordingly heat tends to accumulate on the inside. For this reason, there is a problem that this is not suitable for the sound insulation of equipment and automobiles, which is disclosed in JP4832245B in particular.

In addition, the sound insulation performance of the sound absorber disclosed in JP4832245B changes smoothly according to the usual stiffness law or mass law. For this reason, it has been difficult to effectively use the sound absorber in general equipment and automobiles in which specific frequency components, such as motor sounds, are often strongly generated in a pulsed manner.

In U.S. Pat. No. 7,395,898B (corresponding Japanese Patent Application Publication: JP2005-250474A), the sound attenuation panel can be made very thin and light at low density, can be used at frequencies lower than 500 Hz, can deviate from the law of mass density, and can be easily manufactured at low cost. However, as a lighter and thinner sound insulation structure required in equipment, automobiles, general households, and the like, there are the following problems.

In the sound attenuation panel disclosed in U.S. Pat. No. 7,395,898B (corresponding Japanese Patent Application Publication: JP2005-250474A), a weight is essential for the film. Accordingly, since the structure becomes heavy, it is difficult to use the sound attenuation panel in equipment, automobiles, general households, and the like.

There is no easy means for placing the weight in each cell structure. Accordingly, there is no manufacturing suitability.

Since the frequency and size of shielding strongly depend on the weight of the weight and the position of the weight on the film, robustness as a sound insulation material is low. Accordingly, there is no stability.

Since the film is specified as an impermeable film, the film does not allow wind or heat to pass therethrough and accordingly heat tends to accumulate on the inside. For this reason, this is not suitable for the sound insulation of equipment and automobiles in particular.

An object of the present invention is to solve the aforementioned problems of the conventional techniques and provide a soundproof structure which is light and thin, in which sound insulation characteristics such as a shielding frequency and a shielding size do not depend on the position and shape of the hole, which has high robustness as a sound insulation material and is stable, which has air permeability so that wind and heat can pass therethrough and accordingly no heat accumulates on the inside, which is suitable for equipment, automobiles, and household applications, and which is excellent in manufacturing suitability, and a louver and a partition using such a soundproof structure.

In the present invention, "soundproof" includes the meaning of both "sound insulation" and "sound absorption" as acoustic characteristics, but in particular, refers to "sound insulation". "Sound insulation" refers to "shielding sound", that is, "not transmitting sound", and accordingly, includes "reflecting" sound (reflection of sound) and "absorbing" sound (absorption of sound) (refer to Sanseido Daijibin (Third Edition) and http://www.onzai.or.jp/question/sound-proof.html and http://www.onzai.or.jp/pdf/new/gijutsu201312_3.pdf on the web page of the Japan Acoustological Materials Society).

Hereinafter, basically, "sound insulation" and "shielding" are referred to in a case where "reflection" and "absorption" are not distinguished from each other, and "reflection" and "absorption" are referred to in a case where "reflection" and "absorption" are distinguished from each other.

As a result of intensive examination to achieve the above object, the present inventors found out that the above problems could be solved as follows, and completed the present invention. Two or more soundproof cells arranged in a two-dimensional manner are provided. At least one of the soundproof cells is a first soundproof cell configured to include a first frame having a first through-hole. At least one of the other soundproof cells is a second soundproof cell including a second frame having a second through-hole and a film fixed to the second frame. The soundproof structure has a first shielding peak frequency, which is determined by the first through-hole of the first soundproof cell and at which a transmission loss is maximized, on a lower frequency side than a first natural vibration frequency of the film of the second soundproof cell, and selectively insulates sound in a predetermined frequency band centered on the first shielding peak frequency.

That is, the present invention provides the following soundproof structure, louver, and partition.

(1) A soundproof structure comprising two or more soundproof cells arranged in a two-dimensional manner. At least one of the soundproof cells is a first soundproof cell configured to include a first frame having a first through-hole. At least one of the other soundproof cells is a second soundproof cell comprising a second frame having a second through-hole and a film fixed to the second frame. The soundproof structure has a first shielding peak frequency, which is determined by the first through-hole of the first soundproof cell and at which a transmission loss is maximized, on a lower frequency side than a first natural vibration frequency of the film of the second soundproof cell, and selectively insulates sound in a predetermined frequency band centered on the first shielding peak frequency.

(2) The soundproof structure described in (1) in which a size of the soundproof structure is equal to or less than a wavelength of sound at the first shielding peak frequency.

(3) The soundproof structure described in (1) or (2) in which the first natural vibration frequency of the film of the second soundproof cell is determined by a geometric form of the second frame of the second soundproof cell and stiffness of the film and the first shielding peak frequency is determined according to a path length and an opening diameter of the first through-hole of the first soundproof cell.

(4) The soundproof structure described in any one of (1) to (3) in which the first natural vibration frequency is included within a range of 10 Hz to 100000 Hz.

(5) The soundproof structure described in any one of (1) to (4) in which the first soundproof cell causes a phase lead of 20° or more for sound waves transmitted through the first through-hole.

(6) The soundproof structure described in any one of (1) to (5) in which the two or more second soundproof cells having different first natural vibration frequencies of the film are provided.

(7) The soundproof structure described in any one of (1) to (6) in which the second soundproof cell has the two or more films fixed so as to be multilayered in a thickness direction of the second frame.

(8) The soundproof structure described in any one of (1) to (7) in which a sound absorbing material is disposed in at least one of the first through-holes.

(9) The soundproof structure described in any one of (1) to (8) in which an odor eliminating material is disposed in at least one of the first through-holes.

(10) A louver comprising the soundproof structure described in any one of (1) to (9).

(11) A partition comprising the soundproof structure described in any one of (1) to (9).

According to the present invention, it is possible to provide a soundproof structure which is light and thin, which has high robustness as a sound insulation material and is stable, which has air permeability so that wind and heat can pass therethrough and accordingly no heat accumulates on the inside, which is suitable for equipment, automobiles, and household applications, and which is excellent in manufacturing suitability.

In addition, according to the present invention, it is possible to reliably and easily manufacture such a soundproof structure. In particular, according to the present invention, an arbitrary desired frequency component can be shielded very strongly.

According to the present invention, large sound insulation can be done near 1000 Hz, which is generally difficult to shield with a thin and light structure even with the mass law and the stiffness law and which is a region that can be heard largely by the human ear.

According to the present invention, it is possible to realize a strong sound insulation structure simply by providing a soundproof cell having no film.

According to the present invention, since a weight that causes an increase in the mass is not required for the sound attenuation panel and the structure disclosed in U.S. Pat. No. 7,395,898B (corresponding Japanese Patent Application Publication: JP2005-250474A), it is possible to realize a lighter sound insulation structure.

According to the present invention, since a soundproof cell having no film is present, it is possible to realize a structure for shielding sound while securing air permeability, that is, while allowing wind or heat to pass therethrough.

According to the present invention, since only a soundproof cell having no film is provided, manufacturing is easy.

According to the present invention, since the sound insulation characteristics hardly depend on the position of the soundproof cell having no film, there is an advantage that stability is high in manufacturing.

DESCRIPTION OF THE PREFERRED EMBODIMENTS

Hereinafter, a soundproof structure, a louver, and a partition according to the present invention will be described in detail with reference to preferred embodiments shown in the accompanying diagrams.

The description of constituent elements described below may be made based on representative embodiments of the present invention, but the present invention is not limited to such embodiments.

The numerical range expressed by using "~" in this specification means a range including numerical values described before and after "~" as a lower limit and an upper limit.

A soundproof structure of the present invention is a soundproof structure having two or more soundproof cells arranged in a two-dimensional manner. At least one of the soundproof cells is a first soundproof cell configured to include a first frame having a first through-hole.

At least one of the other soundproof cells is a second soundproof cell comprising a second frame having a second through-hole and a film fixed to the second frame. A first shielding peak frequency, which is determined by the first through-hole of the first soundproof cell and at which a transmission loss is maximized, is present on a lower frequency side than a first natural vibration frequency of the film of the second soundproof cell, and sound in a predetermined frequency band centered on the first shielding peak frequency is selectively insulated.

Figure 1:
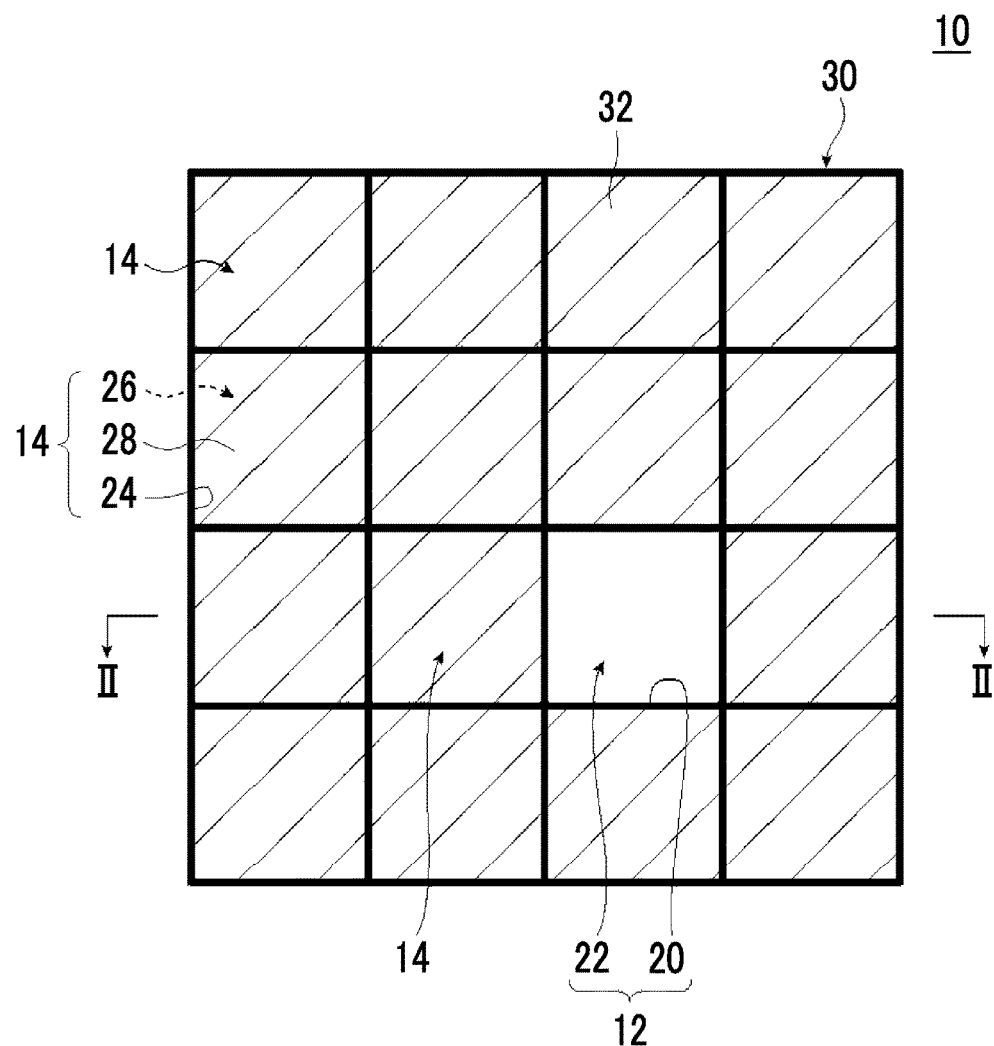
FIG. 1 a plan view schematically showing an example of a soundproof structure according to the present invention.
Figure 2:
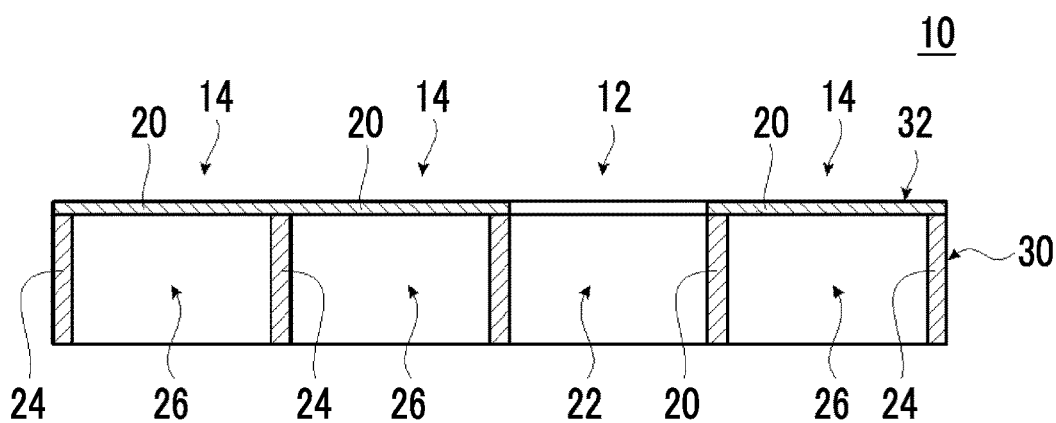
FIG. 2 is a schematic cross-sectional view of the soundproof structure shown in FIG. 1 taken along the line II-II.

FIG. 1 is a plan view schematically showing an example of a soundproof structure according to a first embodiment of the present invention, and FIG. 2 is a schematic cross-sectional view of the soundproof structure shown in FIG. 1 taken along the line II-II.

In FIG. 1, a film 28 is hatched to clarify the configuration. This also applies to FIGS. 3 and 4 and the like to be described later.

As shown in FIGS. 1 and 2, a soundproof structure 10 has a plurality of soundproof cells arranged in a two-dimensional manner, in the illustrated example, 16 soundproof cells are arranged in 4×4. One of the soundproof cells is a first soundproof cell 12 configured to include a first frame 20 having a first through-hole 22. The remaining 15 soundproof cells are second soundproof cells 14 each including a second frame 24 having a second through-hole 26 and the film 28 that is fixed to the second frame 24 and is disposed so as to cover one opening surface of the second frame 24.

The first soundproof cell 12 and the second soundproof cells 14 arranged in a two-dimensional manner are arranged with the opening surface of the first through-hole 22 and the surface of the film 28 in the same direction.

The shapes of the first soundproof cell 12 (opening portion of the first through-hole 22) and the second soundproof cell 14 (opening portion of the second through-hole 26) as viewed from a direction perpendicular to a plane in which soundproof cells are arranged in a two-dimensional manner (hereinafter, referred to as "in a plan view") are approximately square shapes.

The second soundproof cell 14 has a configuration in which the second through-hole 26 of the second frame 24 is covered with the film 28. With such a configuration of the second soundproof cell 14, the film 28 vibrates in response to sound waves from the outside to absorb or reflect the energy of sound waves, thereby insulating sound. For this reason, it is preferable that the film 28 is impermeable to air.

Here, the film 28 fixed to the second frame 24 of the second soundproof cell 14 has a first natural vibration frequency at which the transmission loss is the minimum, for example 0 dB, as a resonance frequency that is a frequency of the lowest order natural vibration mode.

The first natural vibration frequency is determined by the geometric form of the second frame 24, the stiffness of the film 28, and the like.

The first soundproof cell 12 has a configuration configured to include the first frame 20 having the first through-hole 22. Therefore, sound waves from the outside are transmitted.

In the case of a sound wave having a lower frequency than the first natural vibration frequency, among sound waves transmitted through the second soundproof cell 14, a phase lag of approximately 90° occurs in a case where the sound wave passes through the second soundproof cell 14. In the case of a sound wave having a higher frequency than the first natural vibration frequency, a phase lead of approximately 90° occurs in a case where the sound wave passes through the second soundproof cell 14.

On the other hand, in the case of a sound wave transmitted through the first soundproof cell 12, a phase lead occurs depending on the structure (opening diameter and path length) of the first through-hole 22 of the first soundproof cell 12.

Here, the path length is the length of the shortest propagation path of the sound wave passing through the first soundproof cell 12. In FIG. 2, the thickness of the first frame 20 is the path length.

Therefore, a phase difference occurs between the sound wave transmitted through the first soundproof cell 12 and the sound wave having a lower frequency than the first natural vibration frequency, among the sound waves transmitted through the second soundproof cell 14, and the sound waves cancel each other. As a result, it is possible to insulate sound on the lower frequency side than the first natural vibration frequency.

In this case, due to the first through-hole 22 of the first soundproof cell 12, with a predetermined frequency on the lower frequency side than the first natural vibration frequency as a shielding peak, it is possible to selectively insulate sound in a predetermined frequency band centered on the frequency.

In the following description, a shielding peak wavelength at which the transmission loss is maximized on the lower frequency side than the first natural vibration frequency, which is determined due to the first through-hole 22 of the first soundproof cell 12, is referred to as a "first shielding peak frequency".

As described above, conventionally, in a sound absorber (soundproof structure) configured to include a frame body having a through-hole and a sound absorbing material (film body) covering the through-hole, the range of selection of materials of the film body and the like is narrow in the case of trying to achieve a high sound absorption effect (sound insulation characteristics) in a low frequency region. Therefore, there is a problem that it is difficult to improve the sound insulation characteristics in the lower frequency region.

Since the film body of such a soundproof structure completely blocks the through-hole of the frame body, the film body does not allow wind or heat to pass therethrough and accordingly heat tends to accumulate on the inside. For this reason, there is a problem that this is not suitable for the sound insulation of equipment in which the source of sound is also a heat source, such as general equipment or automobiles having a driving source.

In addition, the sound insulation characteristics of such a soundproof structure change smoothly according to the usual stiffness law or mass law. For this reason, it has been difficult to effectively use the sound structure in general equipment and automobiles in which specific frequency components, such as motor sounds, are often strongly generated in a pulsed manner.

In a soundproof structure having a configuration in which a weight is given to the film body, there is a problem that the structure becomes heavy, and there is a problem that there is no manufacturing suitability since there is no easy means for placing a weight in each cell structure.

Since the frequency or size of shielding strongly depends on the weight of the weight, the position of the weight on the film, or the like, there is a problem that robustness is low and there is no stability.

In contrast, as described above, the soundproof structure of the present invention has a first soundproof cell, which includes a first frame having a first through-hole, and a second soundproof cell, which includes a second frame having a second through-hole and a film fixed to the second frame. Therefore, a phase difference occurs between the sound wave transmitted through the first soundproof cell and the sound wave having a lower frequency than the first natural vibration frequency of the second soundproof cell, among sound waves transmitted through the second soundproof cell, and the sound waves cancel each other. As a result, it is possible to insulate sound in a predetermined frequency band centered on the first shielding peak frequency on the lower frequency side than the first natural vibration frequency.

In addition, since the first soundproof cell does not have a film, the first through-hole of the first frame is not blocked. For this reason, wind and heat can pass through the first through-hole of the first frame. Therefore, since heat can be suppressed from accumulating on the inside, the soundproof structure of the present invention can be used for sound insulation of equipment in which the source of sound is also a heat source, such as general equipment or automobiles having a driving source.

Since the first shielding peak frequency is determined by the shape of the first through-hole (opening diameter and path length) and the like, the range of selection of materials of the film body and the like is not narrow. In addition, since only a soundproof cell having no film is provided, the soundproof structure of the present invention can be made light and can be easily manufactured.

Since the sound insulation characteristics hardly depend on the position of the first soundproof cell having no film, there is an advantage that stability is high in manufacturing.

According to the present invention, it is possible to shield an arbitrary desired frequency component very strongly simply by providing the first soundproof cell having no film. In addition, since it is possible to insulate sound on the lower frequency side than the first natural vibration frequency of the film of the second soundproof cell, it is possible to improve the sound insulation characteristics in the lower frequency region.

The phase lead for the transmitted sound wave caused by the first soundproof cell 12 is preferably 20° or more, more preferably 55° or more.

Under the conditions in which the amplitudes of sound waves transmitted through the first soundproof cell 12 and the second soundproof cell are the same, a transmission loss (sound insulation characteristic) of 5 dB or more can be obtained in a case where the phase lead by the first soundproof cell 12 is 20°, and a transmission loss of 10 dB or more can be obtained in a case where the phase lead is 55°.

Here, in the illustrated example, the first frame 20 and the second frame 24 are integrally formed, and are formed by one frame body 30.

All the films 28 of the second soundproof cells 14 are integrally formed, and are formed by one film body 32.

That is, the soundproof structure 10 is configured to have the frame body 30, which has 16 through-holes arranged in a two-dimensional manner, and the film body 32, which is fixed to the frame body 30 so as to cover the opening surface of each through-hole of the frame body 30 on one surface side of the frame body 30. The film body 32 has an opening portion, which has a size approximately equal to the size of the opening portion of the through-hole, in a region corresponding to one through-hole among the 16 through-holes. As a result, portions corresponding to the respective through-holes of the frame body 30 form one first soundproof cell 12 and 15 second soundproof cells.

Without being limited to the configuration in which all the soundproof cells are integrally formed by one frame body and one film body, a soundproof structure may be formed by arranging a plurality of soundproof cells, in which frames and films are formed independently of each other, in a two-dimensional manner. Alternatively, a soundproof structure may be formed by arranging a plurality of structures in which two or more soundproof cells are integrally formed by one frame body and one film body.

Two or more film bodies may be used without being limited to the configuration in which one film body covers all the second through-holes serving as the second soundproof cells of the frame body.

Figure 3:
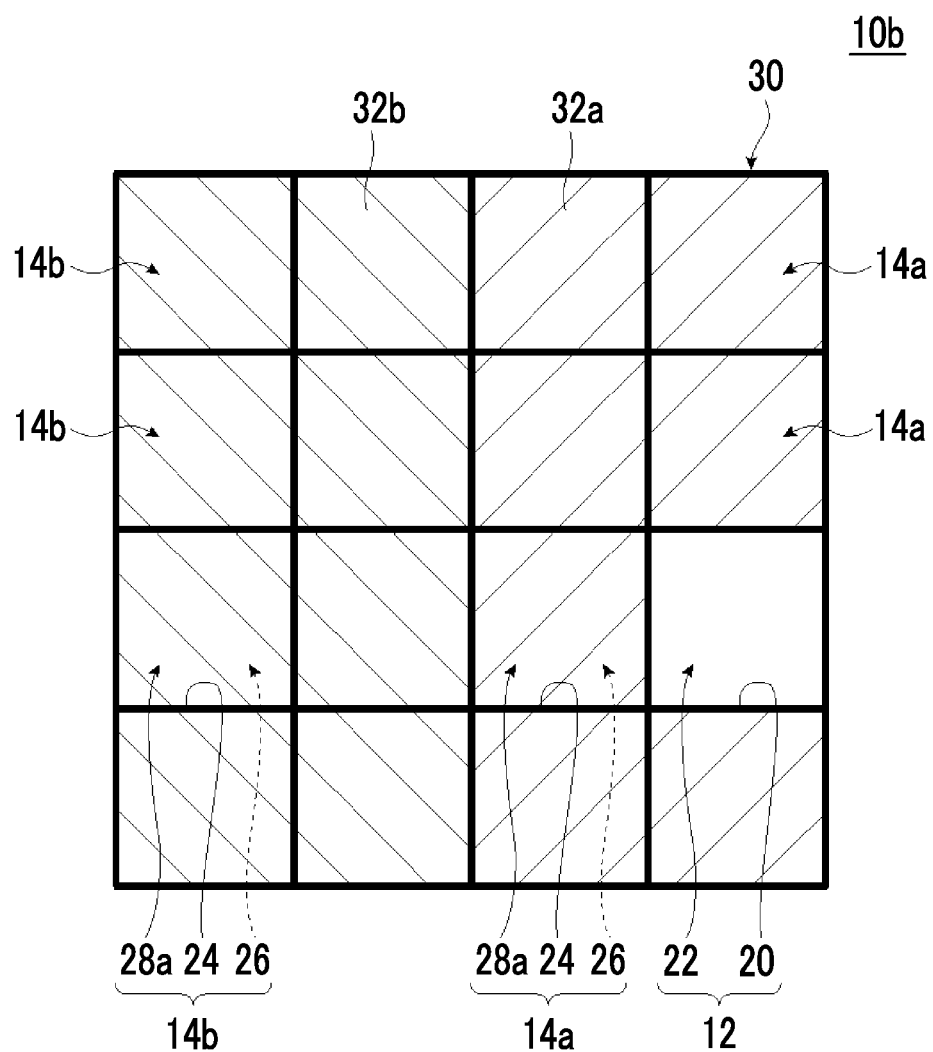
FIG. 3 is a plan view schematically showing another example of the soundproof structure according to the present invention.

For example, as in a soundproof structure 10b shown in FIG. 3, a configuration having two film bodies of a film body 32b covering eight second through-holes 26, among through-holes of the frame body 30 having sixteen through-holes, and a film body 32a covering the remaining seven second through-holes 26 may be adopted. In this case, materials, thicknesses, and the like of the film body 32a and the film body 32b may be the same or different.

Although the soundproof structure 10 is configured to have 16 soundproof cells of one first soundproof cell 12 and 15 second soundproof cells 14 in the illustrated example, a configuration having one or more first soundproof cells 12 and one or more second soundproof cells 14 may be adopted.

Figure 4:
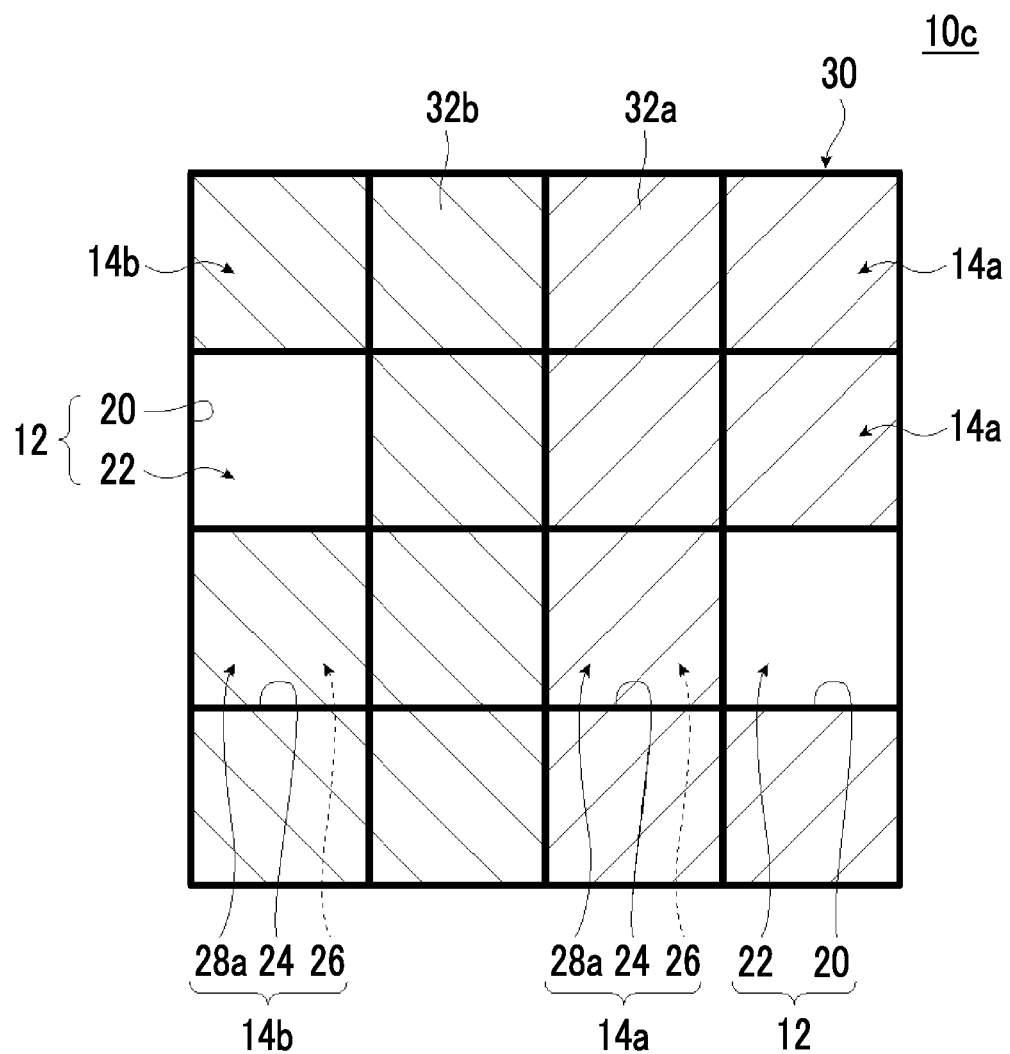
FIG. 4 is a plan view schematically showing another example of the soundproof structure according to the present invention.

For example, as in a soundproof structure 10c shown in FIG. 4, a configuration having 16 soundproof cells of two first soundproof cells 12 and 14 second soundproof cells 14 (14a and 14b) may be adopted. Alternatively, for example, a configuration having 25 soundproof cells of one first soundproof cell 12 and 24 second soundproof cells 14 may be adopted.

The ratio (opening ratio) of the total area of the opening portion of the first through-hole 22 of the first soundproof cell 12 with respect to the area of the front surface of the soundproof structure 10 (that is, the total area of the front surfaces of the first soundproof cell 12 and the second soundproof cell 14) is preferably 0.1% to 50%, and more preferably 1% to 10%.

The arrangement positions of the first soundproof cell 12 and the second soundproof cell 14 in the soundproof structure 10 are not particularly limited either, but it is preferable to uniformly arrange the first soundproof cell 12 and the second soundproof cell 14.

In FIG. 1, the size of the first soundproof cell 12 in a plan view, that is, the size of the opening portion of the first through-hole 22 in a plan view is the same as the size of the second soundproof cell 14 in a plan view, that is, the size of the opening portion of the second through-hole 26 in a plan view. However, the size of the first soundproof cell 12 may be different from the size of the second soundproof cell 14 without being limited to the above.

In a case where two or more first soundproof cells 12 are provided, the sizes of the two or more first soundproof cells 12 may be different.

Similarly, in a case where two or more second soundproof cells 14 are provided, the sizes of the two or more second soundproof cells 14 may be different.

From the viewpoint of manufacturing efficiency, it is preferable that the sizes of all the through-holes are the same.

In a case where two or more second soundproof cells 14 are provided, two or more types of second soundproof cells 14 having different first natural vibration frequencies of the film 28 may be provided.

Similarly, in a case where two or more first soundproof cells 12 are provided, two or more types of first soundproof cells 12 having different opening diameters or path lengths of the first through-holes 22 may be provided.

These points will be described in detail later.

Next, each component of the soundproof structure will be described.

The first soundproof cell 12 and the second soundproof cell 14 have the same configuration except for whether or not the film 28 is provided. Therefore, in the following description, in a case where there is no need to distinguish between the first frame 20 and the second frame 24 and between the first through-hole 22 and the second through-hole 26, the first frame and the second frame are collectively referred to as a frame, and the first through-hole and the second through-hole are collectively referred to as a through-hole.

A frame is formed so as to be annularly surrounded by a thick plate-shaped member, and has a through-hole thereinside.

The frame has higher stiffness than the film. Specifically, both the mass and the stiffness of the frame per unit area need to be high.

It is preferable that the shape of the frame has a closed continuous shape. However, the present invention is not limited thereto, and the frame may be partially cut to have a discontinuous shape. Small cuts may be included in the frame.

The second frame 24 is for fixing the film 28 so as to cover the second through-hole 26 on at least one side, and serves as a node of film vibration of the film 28 fixed to the second frame 24.

Even if the second frame 24 is partially cut to have a discontinuous shape, the second frame 24 may be used as long as the second frame 24 serves as a node of film vibration of the fixed film 28. Even if there is a very slightly unbonded part, the effect is achieved.

The shape of the through-hole formed by the frame is a planar shape, and is a square in the example shown in FIG. 1. In the present invention, however, the shape of the through-hole is not particularly limited. For example, the shape of the through-hole may be a quadrangle such as a rectangle, a diamond, or a parallelogram, a triangle such as an equilateral triangle, an isosceles triangle, or a right triangle, a polygon including a regular polygon such as a regular pentagon or a regular hexagon, an elliptical shape, and the like, or may be an irregular shape. End portions of the opening portion on both sides of the through-hole of the frame are not blocked and accordingly are open to the outside as they are. The film 28 is fixed to the frame so as to cover the opening portion in at least one end portion of the opened opening portion.

The size of the frame is a size in a plan view, and can be defined as the size of the through-hole. However, in the case of a regular polygon such as a square shown in FIG. 1 or a circle, the size of the frame 14 can be defined as a distance between opposite sides passing through the center or as a circle equivalent diameter. In the case of a polygon, an ellipse, or an irregular shape, the size of the frame 14 can be defined as a circle equivalent diameter. In the present invention, the circle equivalent diameter and the radius are a diameter and a radius at the time of conversion into circles having the same area.

In the soundproof structure of the present invention, the size of the frame may be fixed in all frames. However, frames having different sizes (including a case where shapes are different) may be included. In this case, the average size of the frames may be used as the size of the frame.

The size of the frame is not particularly limited, and may be set according to a soundproofing target to which the soundproof structure of the present invention is applied, for example, a copying machine, a blower, air conditioning equipment, a ventilator, a pump, a generator, a duct, industrial equipment including various kinds of manufacturing equipment capable of emitting sound such as a coating machine, a rotary machine, and a conveyor machine, transportation equipment such as an automobile, a train, and aircraft, and general household equipment such as a refrigerator, a washing machine, a dryer, a television, a copying machine, a microwave oven, a game machine, an air conditioner, a fan, a PC, a vacuum cleaner, an air purifier, and a ventilator.

The soundproof structure itself can also be used like a partition in order to shield sound from a plurality of noise sources. Also in this case, the size of the frame can be selected from the frequency of the target noise.

Although the details will be described later, it is preferable to reduce the size of the second frame in order to obtain the natural vibration mode of the second soundproof cell 14 on the high frequency side.

In order to prevent the through-hole from being clogged by foreign matter, it is preferable that the size of the first frame is 1 µm or more.

From these viewpoints, the size of the frame is preferably 0.5 mm to 200 mm, more preferably 1 mm to 100 mm, and most preferably 2 mm to 30 mm.

The size of the frame is preferably expressed by an average size, for example, in a case where different sizes are included in each frame.

In addition, the width (width of each frame that forms a frame) and the thickness of the frame are not particularly limited as long as the film 28 can be fixed so as to be reliably restrained and accordingly the film 28 can be reliably supported. For example, the width and the thickness of the frame can be set according to the size of the frame.

For example, in a case where the size of the frame is 0.5 mm to 50 mm, the width of the frame is preferably 0.5 mm to 20 mm, more preferably 0.7 mm to 10 mm, and most preferably 1 mm to 5 mm.

In a case where the ratio of the width of the frame to the size of the frame is too large, the area ratio of the frame with respect to the entire structure increases. Accordingly, there is a concern that the device will become heavy. On the other hand, in a case where the ratio is too small, it is difficult to strongly fix the film with an adhesive or the like in the frame portion.

In a case where the size of the frame exceeds 50 mm and is equal to or less than 200 mm, the width of the frame is preferably 1 mm to 100 mm, more preferably 3 mm to 50 mm, and most preferably 5 mm to 20 mm.

The thickness of the frame is preferably 10 µm or more, more preferably 0.5 mm to 200 mm, even more preferably 0.7 mm to 100 mm, and most preferably 1 mm to 50 mm so that the vibration of the frame is not affected.

It is preferable that the width and the thickness of the frame are expressed by an average width and an average thickness, respectively, for example, in a case where different widths and thicknesses are included in each frame.

Here, as described above, the first shielding peak frequency is determined according to the structure of the first through-hole 22 formed in the first frame 20, specifically, the opening diameter and the path length.

Therefore, the thickness of the first frame 20 may be set according to the size of the frame or the above-described soundproofing target so that an arbitrary first shielding peak frequency is obtained.

The thickness of the first frame and the thickness of the second frame may be different.

Figure 5A:
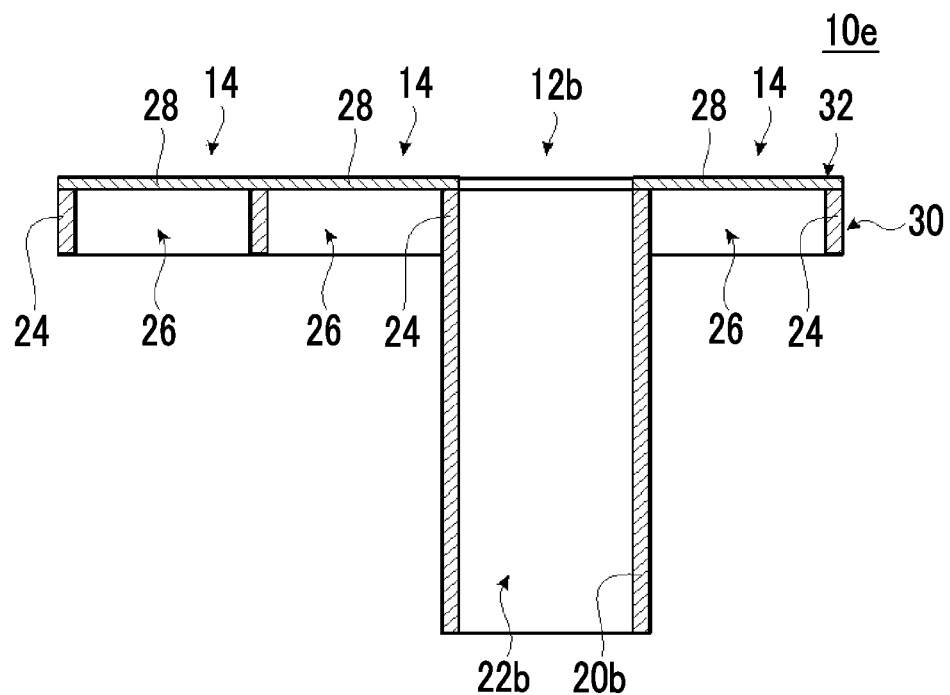
FIG. 5A is a cross-sectional view schematically showing another example of the soundproof structure according to the present invention.

For example, as in a soundproof structure 10e shown in FIG. 5A, the thickness of a first frame 20b of a first soundproof cell 12b may be larger than the thickness of the second frame 24 of the second soundproof cell 14. By adjusting the thickness of the first frame 20b to adjust the path length of the first through-hole 22b of the first frame 20b, the amount of phase lead by the first soundproof cell 12b can be adjusted. As a result, the first shielding peak frequency can be set to a desired frequency.

The shape of the first through-hole of the first frame is not limited to the straight tube shape, and the first shielding peak frequency may be set to a desired frequency by appropriately setting the shape of the first through-hole.

Figure 5B:
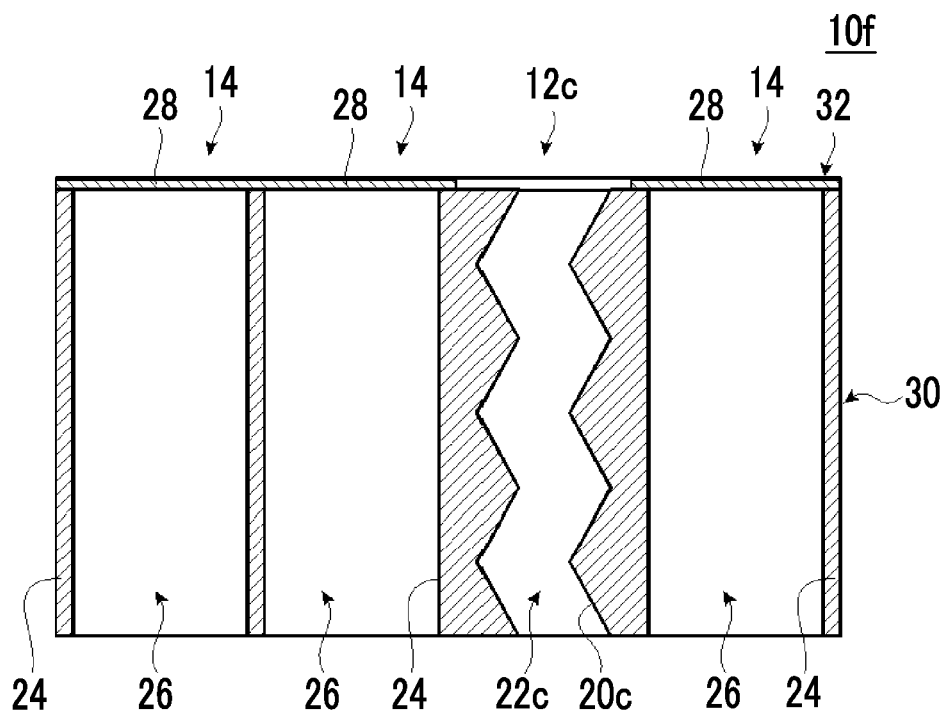
FIG. 5B is a cross-sectional view schematically showing another example of the soundproof structure according to the present invention.

For example, in a soundproof structure 10f shown in FIG. 5B, a first through-hole 22c of a first frame 20c forming a first soundproof cell 12c has a shape bent repeatedly in an S shape in the central axis direction.

By forming the first through-hole 22c in such a shape, the amount of phase lead by the first soundproof cell 12b can be adjusted by increasing the path length of the transmitted sound wave. As a result, the first shielding peak frequency can be set to a desired frequency.

Figure 5C:
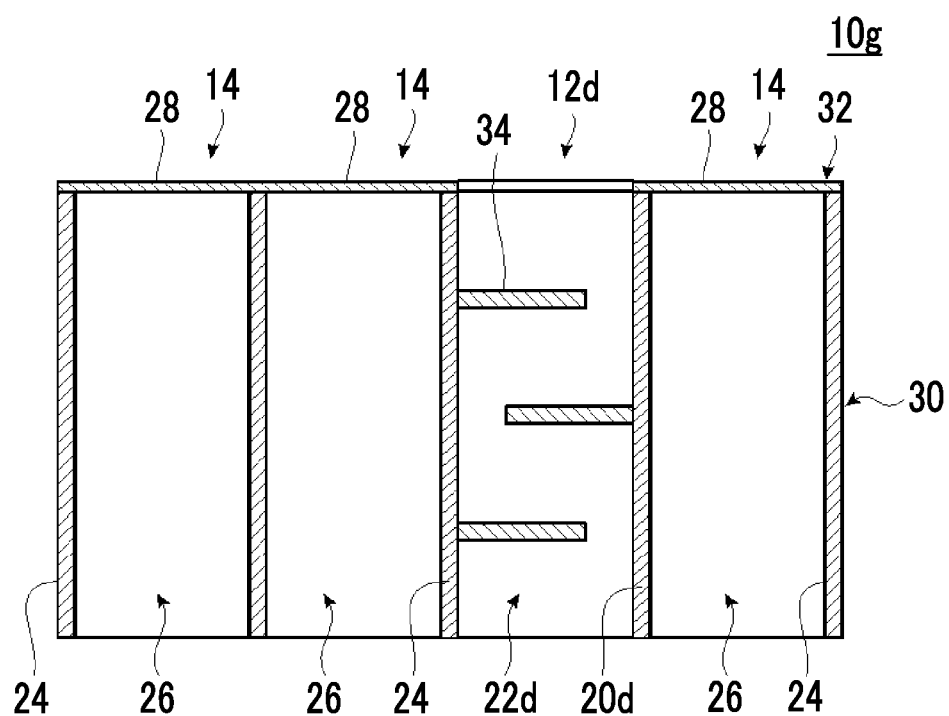
FIG. 5C is a cross-sectional view schematically showing another example of the soundproof structure according to the present invention.

As in a soundproof structure 10g shown in FIG. 5C, the path length of the sound wave may be increased by providing one or more straightening plates 34, which are present in a direction perpendicular to the central axis direction of a first through-hole 22d, in a first frame 20d forming the first soundproof cell 12d.

The soundproof structure may be configured to have two or more types of first soundproof cells having different opening diameters or different path lengths of the sound wave in such a first through-hole.

As described above, the number of frames of the soundproof structure of the present invention, that is, the number of soundproof cells is not particularly limited, and may be set according to the above-described soundproofing target of the soundproof structure of the present invention. Alternatively, since the size of the frame described above is set according to the above-described soundproofing target, the number of frames may be set according to the size of the frame.

For example, in the case of in-device noise shielding, the number of frames is preferably 1 to 10000, more preferably 2 to 5000, and most preferably 4 to 1000.

The reason is as follows. For the size of general equipment, the size of the equipment is fixed. Accordingly, in order to make the size of one soundproof cell suitable for the frequency of noise, it is often necessary to perform shielding with a frame body obtained by combining a plurality of soundproof cells. In addition, by increasing the number of soundproof cells too much, the total weight is increased by the weight of the frame. On the other hand, in a structure such as a partition that is not limited in size, it is possible to freely select the number of frames according to the required overall size.

The material of the frame, that is, the material of the frame body, is not particularly limited as long as the material can support the film, has a suitable strength in the case of being applied to the above soundproofing target, and is resistant to the soundproof environment of the soundproofing target, and can be selected according to the soundproofing target and the soundproof environment. For example, as materials of the frame, metal materials such as aluminum, titanium, magnesium, tungsten, iron, steel, chromium, chromium molybdenum, nichrome molybdenum, and alloys thereof, resin materials such as acrylic resins, polymethyl methacrylate, polycarbonate, polyamideide, polyarylate, polyether imide, polyacetal, polyether ether ketone, polyphenylene sulfide, polysulfone, polyethylene terephthalate, polybutylene terephthalate, polyimide, and triacetyl cellulose, carbon fiber reinforced plastics (CFRP), carbon fiber, and glass fiber reinforced plastics (GFRP) can be mentioned.

A plurality of materials of the frame may be used in combination.

Since the film 28 is fixed so as to be restrained by the second frame 24 by covering the second through-hole 26 of the second frame 24, the film 28 vibrates in response to sound waves from the outside. By absorbing or reflecting the energy of the sound waves, the sound is insulated. For this reason, it is preferable that the film 28 is impermeable to air.

Incidentally, since the film 28 needs to vibrate with the second frame 24 as a node, it is necessary that the film 28 is fixed to the second frame 24 so as to be reliably restrained by the second frame 24 and accordingly becomes an antinode of film vibration, thereby absorbing or reflecting the energy of sound waves to insulate sound. For this reason, it is preferable that the film 28 is formed of a flexible elastic material.

Therefore, the shape of the film 28 is the shape of the second through-hole 26 of the second frame 24. In addition, the size of the film 28 is the size of the second frame 24.

More specifically, the size of the film 28 can be said to be the size of the second through-hole 26 of the second frame 24.

Here, as described above, the film 28 fixed to the second frame 24 of the second soundproof cell 14 has a first natural vibration frequency at which the transmission loss is the minimum, for example 0 dB, as a resonance frequency that is a frequency of the lowest order natural vibration mode. In the present invention, the first natural vibration frequency is determined by the structure configured to include the second frame 24 and the film 28.

Here, the first natural vibration frequency of the film 28, which is fixed so as to be restrained by the second frame 24, in the structure configured to include the second frame 24 and the film 28 is the frequency of the natural vibration mode, in which sound waves are largely transmitted at the frequency in a case where the sound waves cause film vibration most due to the resonance phenomenon. That is, in the present invention, sound is transmitted at the first natural vibration frequency of the film 18.

As described above, in the present invention, a phase difference occurs between the sound wave transmitted through the first soundproof cell having no film and the sound wave having a lower frequency than the first natural vibration frequency, among the sound waves transmitted through the second soundproof cell, and the sound waves cancel each other. As a result, it is possible to insulate sound on the lower frequency side than the first natural vibration frequency.

Therefore, in order to set the shielding peak frequency to an arbitrary frequency within the audible range in the soundproof structure, it is important to obtain the natural vibration mode of the film 28 of the second soundproof cell 14 as high as possible on the high frequency side. In particular, this is practically important.

For this reason, it is preferable to make the film 28 thick, it is preferable to increase the Young's modulus of the material of the film 28, and it is preferable to reduce the size of the second frame 24, accordingly, the size of the film 28 as described above. That is, in the present invention, these preferable conditions are important.

Therefore, since the soundproof structure 10 of the present invention complies with the stiffness law. In order to shield sound waves at frequencies lower than the first natural vibration frequency of the film 28 fixed to the second frame 24, the first natural vibration frequency of the film 28 is preferably 10 Hz to 100000 Hz corresponding to the sound wave sensing range of a human being, more preferably 20 Hz to 20000 Hz that is the audible range of sound waves of a human being, even more preferably 40 Hz to 16000 Hz, most preferably 100 Hz to 12000 Hz.

The thickness of the film 28 is not particularly limited as long as the film can vibrate by absorbing or reflecting the energy of sound waves to insulate sound. However, it is preferable to make the film 18 thick in order to obtain a natural vibration mode on the high frequency side. In the present invention, for example, the thickness of the film 28 can be set according to the size of the second frame 24, that is, the size of the film.

For example, in a case where the size of the second frame 24 is 0.5 mm to 50 mm, the thickness of the film 28 is preferably 0.005 mm (5 μm) to 5 mm, more preferably 0.007 mm (7 μm) to 2 mm, and most preferably 0.01 mm (10 μm) to 1 mm.

In a case where the size of the second frame 24 exceeds 50 mm and is equal to or less than 200 mm, the thickness of the film 28 is preferably 0.01 mm (10 μm) to 20 mm, more preferably 0.02 mm (20 μm) to 10 mm, and most preferably 0.05 mm (50 μm) to 5 mm.

The thickness of the film 28 is preferably expressed by an average thickness, for example, in a case where the thickness of one film 28 is different or in a case where different thicknesses are included in each film 28.

In the soundproof structure 10 of the present invention, the first natural vibration frequency of the film 28 in the structure configured to include the second frame 24 and the film 28 can be determined by the geometric form of the second frame 24 of a plurality of second soundproof cells 14, for example, the shape and size of the second frame 24, and the stiffness of the plurality of films 28, for example, thickness and flexibility of the film 28.

As a parameter characterizing the first natural vibration mode of the film 28, in the case of the film 28 of the same material, a ratio between the thickness (t) of the film 28 and the square of the size (a) of the second frame 24 can be used. For example, in the case of a square, a ratio $[a^2/t]$ between the size of one side and the square of the size (a) of the second frame 24 can be used. In a case where the ratio $[a^2/t]$ is the same, for example, in a case where (t, a) is (50 μm, 7.5 mm) and a case where (t, a) is (200 μm, 15 mm), the first natural vibration mode is the same frequency, that is, the same first natural vibration frequency. That is, by setting the ratio $[a^2/t]$ to a fixed value, the scale law is established. Accordingly, an appropriate size can be selected.

The Young's modulus of the film 28 is not particularly limited as long as the film has elasticity capable of vibrating in order to insulate sound by absorbing or reflecting the energy of sound waves. However, it is preferable to set the Young's modulus of the film 28 to be large in order to obtain a natural vibration mode on the high frequency side. For example, the Young's modulus of the film 28 can be set according to the size of the second frame 24, that is, the size of the film in the present invention.

For example, the Young's modulus of the film 28 is preferably 1000 Pa to 3000 GPa, more preferably 10000 Pa to 2000 GPa, and most preferably 1 MPa to 1000 GPa.

The density of the film 28 is not particularly limited either as long as the film can vibrate by absorbing or reflecting the energy of sound waves to insulate sound. For example, the density of the film 28 is preferably 10 kg/m$^3$ to 30000 kg/m$^3$, more preferably 100 kg/m$^3$ to 20000 kg/m$^3$, and most preferably 500 kg/m$^3$ to 10000 kg/m$^3$.

In a case where a film-shaped material or a foil-shaped material is used as a material of the film 28, the material of the film 28 is not particularly limited as long as the material has a strength in the case of being applied to the above soundproofing target and is resistant to the soundproof environment of the soundproofing target so that the film 28 can vibrate by absorbing or reflecting the energy of sound waves to insulate sound, and can be selected according to the soundproofing target, the soundproof environment, and the like. Examples of the material of the film 28 include resin materials that can be made into a film shape such as polyethylene terephthalate (PET), polyimide, polymethylmethacrylate, polycarbonate, acrylic (PMMA), polyamideide, polyarylate, polyetherimide, polyacetal, polyetheretherketone, polyphenylene sulfide, polysulfone, polyethylene terephthalate, polybutylene terephthalate, polyimide, triacetyl cellulose, polyvinylidene chloride, low density polyethylene, high density polyethylene, aromatic polyamide, silicone resin, ethylene ethyl acrylate, vinyl acetate copolymer, polyethylene, chlorinated polyethylene, polyvinyl chloride, polymethyl pentene, and polybutene, metal materials that can be made into a foil shape such as aluminum, chromium, titanium, stainless steel, nickel, tin, niobium, tantalum, molybdenum, zirconium, gold, silver, platinum, palladium, iron, copper, and permalloy, fibrous materials such as paper and cellulose, and materials or structures capable of forming a thin structure such as a nonwoven fabric, a film containing nano-sized fiber, porous materials including thinly processed urethane or synthrate, and carbon materials processed into a thin film structure.

As described above, the film 28 may be individually fixed to each of the plurality of second frames 24 of the frame body 30 of the soundproof structure 10 to form the sheet-shaped film body 32 as a whole. Conversely, the film 28 covering each second frame 24 may be formed by one sheet-shaped film body 32 fixed so as to cover all the second frames 24. That is, a plurality of films 28 may be formed by one sheet-shaped film body 32 covering a plurality of frames 24. Alternatively, the film 28 covering each second frame 24 may be formed by fixing a sheet-shaped film body to a part of the second frame 24 so as to cover some of the plurality of second frames 24, and the sheet-shaped film body 32 covering all of the plurality of second frames 24 (all second frames 24) may be formed by using some of these sheet-shaped film bodies.

In a case where the soundproof structure has two or more second soundproof cells 14 as described above, the soundproof structure may also be configured to have two or more types of second soundproof cells 14 having different first natural vibration frequencies of the film 28.

That is, the soundproof structure may be configured to have a plurality of second soundproof cells 14 having different first natural vibration frequencies by making the material and the thickness of the film 28 or the size of the second frame 24 different.

For example, in the soundproof structure 10b shown in FIG. 3 or the soundproof structure 10c shown in FIG. 4, each of the films 28a and 28b of the second soundproof cells 14a and 14b is formed by either of the film body 32a and the film body 32b having different thicknesses. Accordingly, the first natural vibration frequencies of films in the second soundproof cell 14a formed by the film body 32a and the second soundproof cell 14b formed by the film body 32b are different frequencies. That is, the frequency band of sound transmitted through the second soundproof cell 14a and the frequency band of sound transmitted through the second soundproof cell 14b are different frequency bands.

Therefore, a frequency shielded due to the sound wave transmitted through the second soundproof cell 14a and the sound wave transmitted through the first soundproof cell 12 canceling each other and a frequency shielded due to the sound wave transmitted through the second soundproof cell 14b and the sound wave transmitted through the first soundproof cell 12 canceling each other are different frequencies.

In this manner, by adopting a configuration having two second soundproof cells 14 having different first natural vibration frequencies of the film 28, it is possible to shield sound at the two first shielding peak frequencies. As a result, it is possible to shield sound from a plurality of noise sources more appropriately.

In the example shown in FIG. 1, the film 28 is fixed to the second frame 24 so as to cover the opening on one side of the second through-hole 26 of the second frame 24.

However, the present invention is not limited thereto, and the film 28 may be fixed so as to cover the opening on at least one side of the second through-hole 26. That is, the film 28 may be fixed to the second frame 24 so as to cover the opening on one side or the other side of the second through-hole 26 of the second frame 24 or to cover the openings on both sides of the second through-hole 26 as in a soundproof structure 10d shown in FIG. 6. That is, a two-layer film 28 may be provided.

Here, all the films 28 may be provided on the same side of the second through-holes 26 of the plurality of second frames 24 of the soundproof structure 10. Alternatively, some of the films 28 may be provided on one side of some of the second through-holes 26 of the plurality of second frames 24, and the remaining films 28 may be provided on the other side of the remaining some second through-holes 26 of the plurality of second frames 24. In addition, films provided on one side, the other side, and both sides of the second through-holes 26 of the second frame 24 may be mixed.

Figure 6:
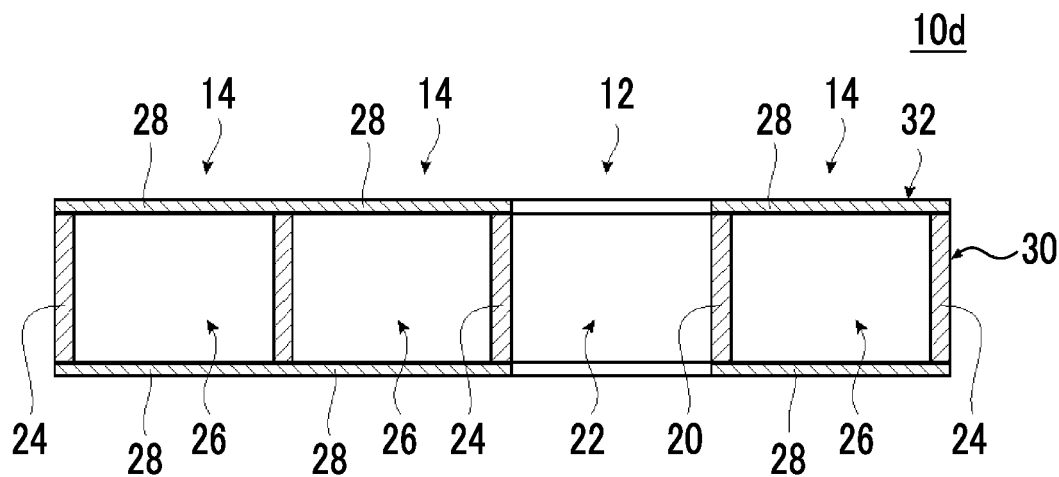
FIG. 6 is a cross-sectional view schematically showing another example of the soundproof structure according to the present invention.

In the example shown in FIG. 6, the film 28 is configured to have two layers.

However, the present invention is not limited thereto, and the film 28 may be configured to have three or more layers.

The method of fixing the film 28 to the second frame 24 is not particularly limited.

Any method may be used as long as the film 28 can be fixed to the second frame 24 so as to serve as a node of film vibration. For example, a method using an adhesive, a method using a physical fixture, and the like can be mentioned.

In the method using an adhesive, an adhesive is applied onto the surface surrounding the second through-hole 26 of the second frame 24 and the film 28 is placed thereon, so that the film 28 is fixed to the second frame 24 with the adhesive. Examples of the adhesive include epoxy-based adhesives (Araldite (registered trademark) (manufactured by Nichiban Co., Ltd.) and the like), cyanoacrylate-based adhesives (Aron Alpha (registered trademark) (manufactured by Nichiban Co., Ltd.) and the like), and acrylic-based adhesives.

As a method using a physical fixture, a method can be mentioned in which the film 28 disposed so as to cover the second through-hole 26 of the second frame 24 is interposed between the second frame 24 and a fixing member, such as a rod, and the fixing member is fixed to the second frame 24 by using a fixture, such as a screw.

Here, it is preferable that the size of the soundproof structure is equal to or less than the wavelength of sound at the first shielding peak frequency. In this regard, results of examination using computer simulation will be described.

Figure 7:
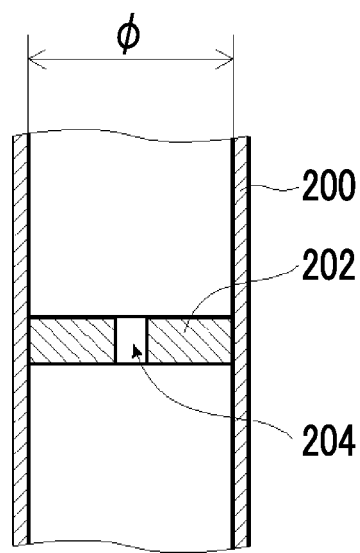
FIG. 7 is a cross-sectional view schematically showing the configuration of a model of a soundproof structure used for simulation.

Specifically, a phase difference of a transmitted wave with respect to an incident wave (hereinafter, referred to as a transmission phase difference) in a structure in which a plate 202 having a hole 204 was disposed in an acoustic tube 200 as shown in FIG. 7 was calculated using a finite element method. The plate 202 was calculated as a rigid body.

This calculation model can be regarded as being equal to a state in which soundproof structures having the same size as the diameter j of the acoustic tube are arranged infinitely on the plane. Accordingly, the hole 204 can be regarded as the first through-hole 22 of the first soundproof cell 12, and the plate 202 can be regarded as a portion (second soundproof cell 14, first frame 20) other than the first through-hole 22.

Figure 8A:
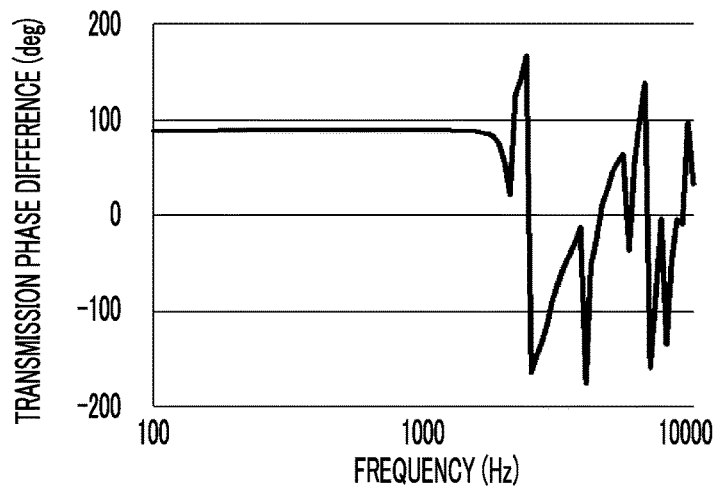
FIG. 8A is a graph showing the relationship between a frequency and a transmission phase difference in an example of the simulation result of the model shown in FIG. 7.
Figure 8B:
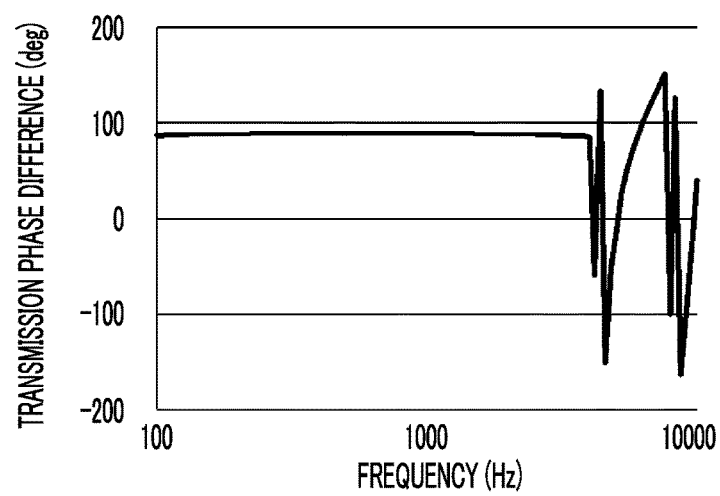
FIG. 8B is a graph showing the relationship between a frequency and a transmission phase difference in another example of the simulation result.
Figure 8C:
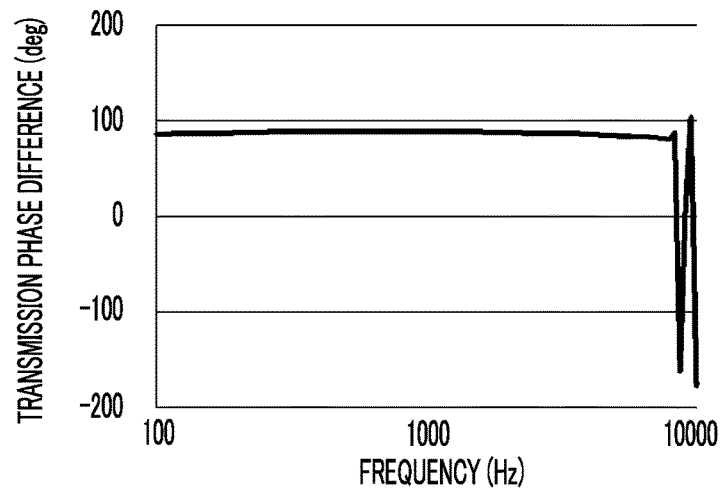
FIG. 8C is a graph showing the relationship between a frequency and a transmission phase difference in another example of the simulation result.
Figure 9A:
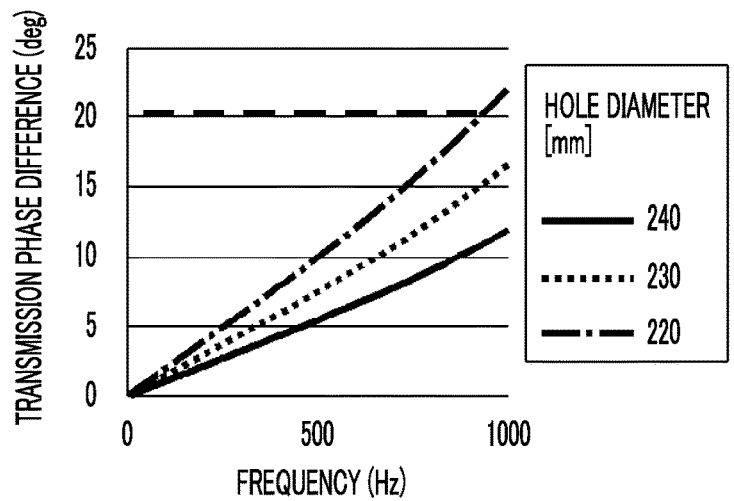
FIG. 9A is a graph showing the relationship between a frequency and a transmission phase difference in another example of the simulation result.
Figure 9B:
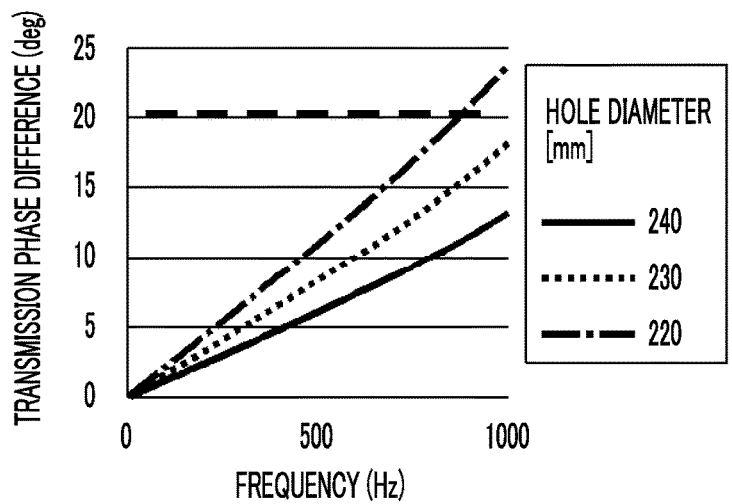
FIG. 9B is a graph showing the relationship between a frequency and a transmission phase difference in another example of the simulation result.
Figure 9C:
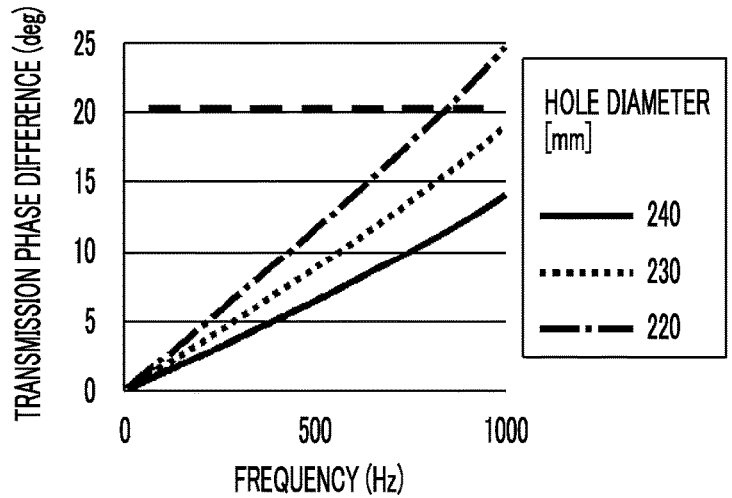
FIG. 9C is a graph showing the relationship between a frequency and a transmission phase difference in another example of the simulation result.
Figure 9D:
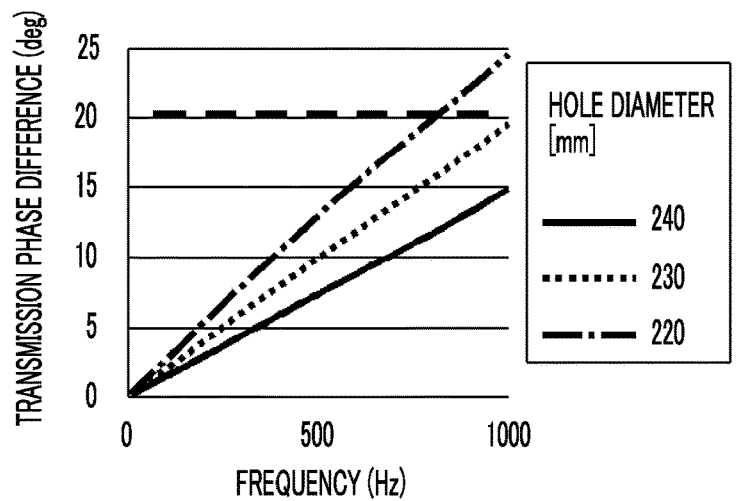
FIG. 9D is a graph showing the relationship between a frequency and a transmission phase difference in another example of the simulation result.
Figure 9E:
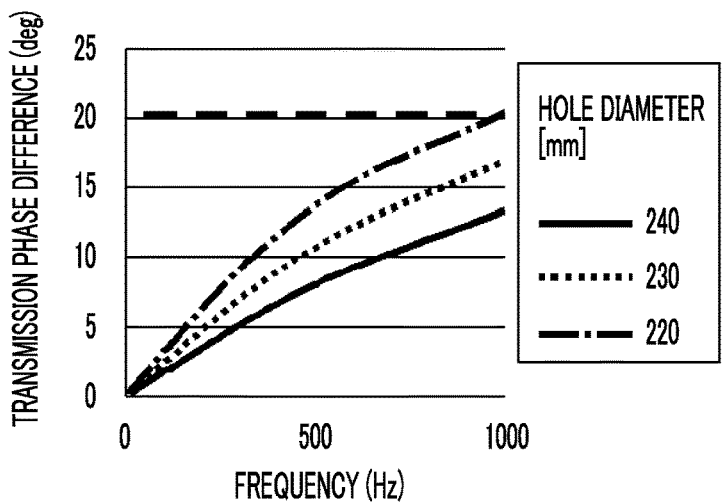
FIG. 9E is a graph showing the relationship between a frequency and a transmission phase difference in another example of the simulation result.
Figure 9F:
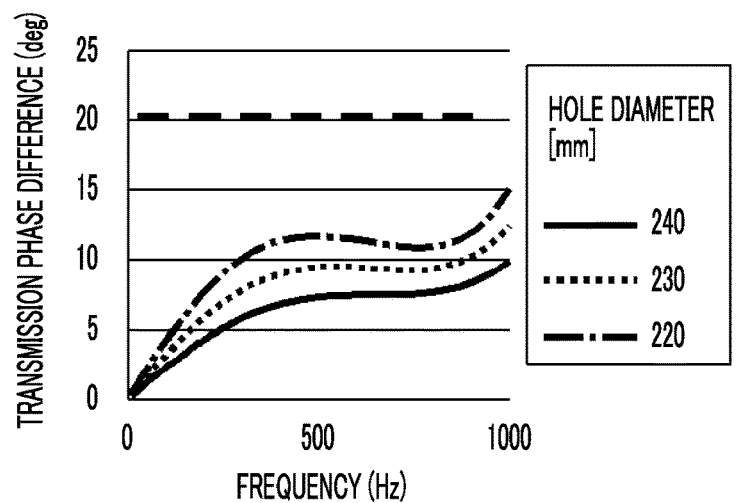
FIG. 9F is a graph showing the relationship between a frequency and a transmission phase difference in another example of the simulation result.
Figure 10A:
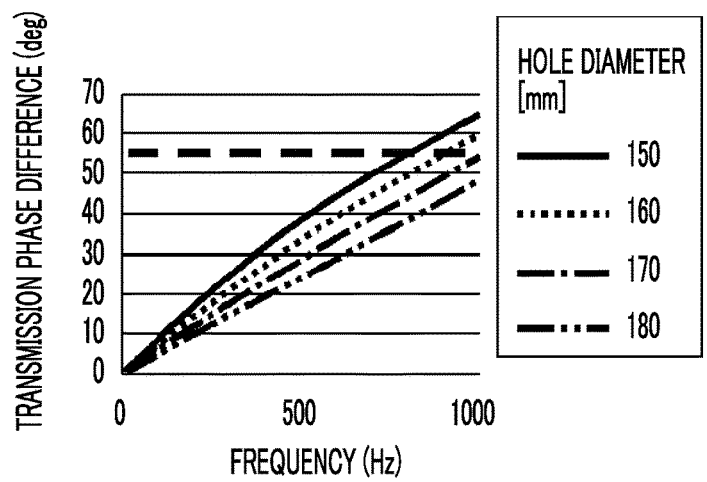
FIG. 10A is a graph showing the relationship between a frequency and a transmission phase difference in another example of the simulation result.
Figure 10B:
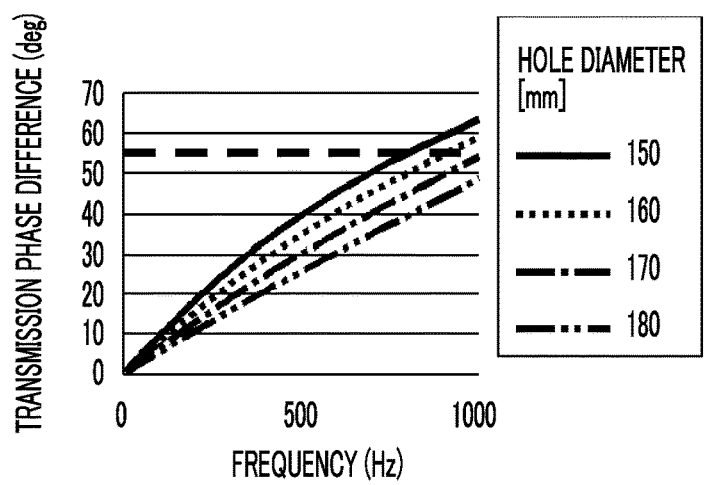
FIG. 10B is a graph showing the relationship between a frequency and a transmission phase difference in another example of the simulation result.
Figure 10C:
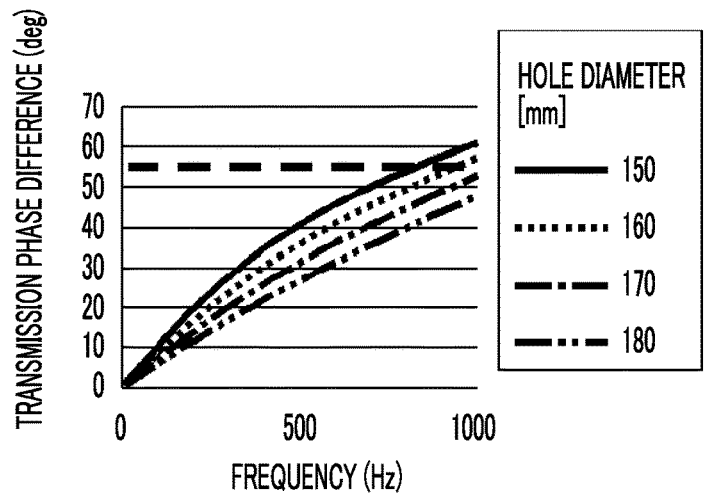
FIG. 10C is a graph showing the relationship between a frequency and a transmission phase difference in another example of the simulation result.
Figure 10D:
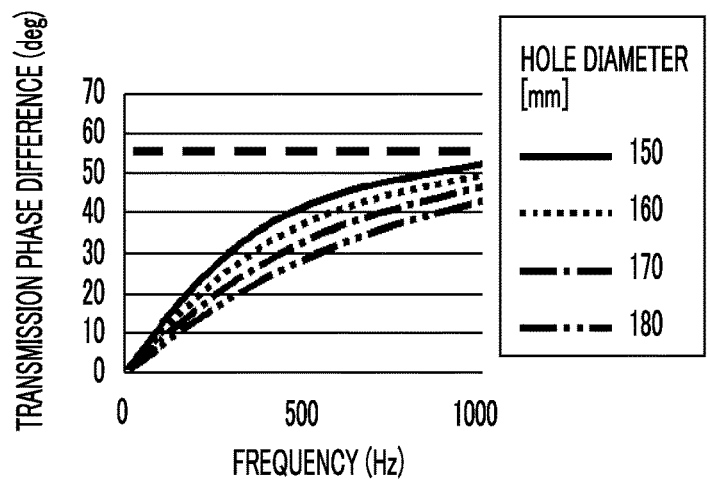
FIG. 10D is a graph showing the relationship between a frequency and a transmission phase difference in another example of the simulation result.
Figure 10E:
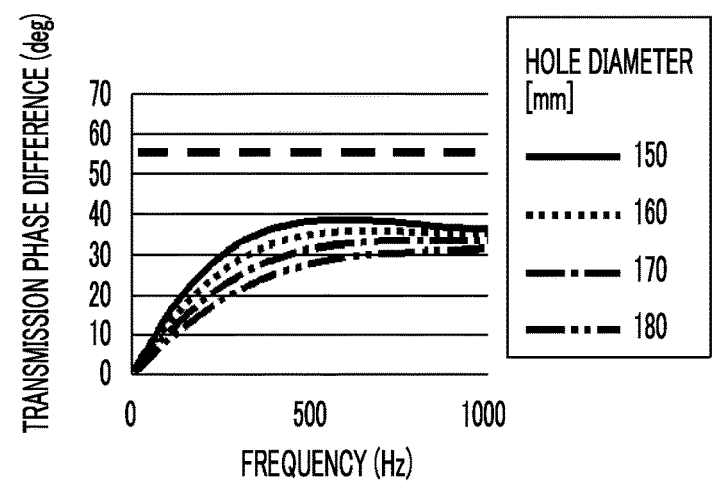
FIG. 10E is a graph showing the relationship between a frequency and a transmission phase difference in another example of the simulation result.
Figure 10F:
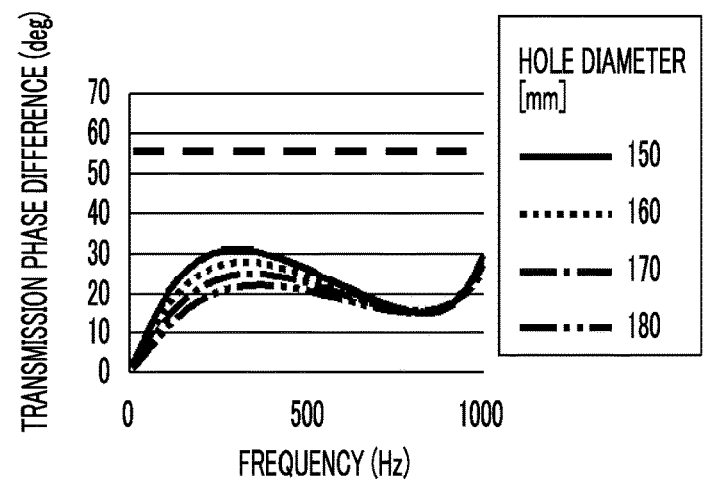
FIG. 10F is a graph showing the relationship between a frequency and a transmission phase difference in another example of the simulation result.

FIGS. 8A to 8C show graphs obtained by calculating the relationship between the frequency (logarithmic expression)

and the transmission phase difference with the diameter φ of the acoustic tube 200 as 20 cm, 10 cm, and 5 cm. The thickness of the plate 202 was 1 mm, the diameter of the hole 204 was 10% of the diameter φ of the acoustic tube 200, and the sound speed was 345 m/s.

As can be seen from FIGS. 8A to 8C, it can be seen that the transmission phase difference begins to be greatly disturbed at a frequency at which the wavelength becomes larger than the diameter of the acoustic tube 200. That is, it can be seen that the transmission phase difference begins to be disturbed from about 1725 Hz (at which the wavelength is 20 cm) or higher in FIG. 8A, the transmission phase difference begins to be disturbed from about 3450 Hz (at which the wavelength is 10 cm) or higher in FIG. 8B, and the transmission phase difference begins to be disturbed from about 6900 Hz (at which the wavelength is 5 cm) or higher in FIG. 8C.

As described above, the soundproof structure of the present invention exhibits high sound insulation characteristics by controlling the phase difference between the sound wave transmitted through the first soundproof cell and the sound wave transmitted through the second soundproof cell. Therefore, in a case where the phase disorder described above occurs, the first shielding peak frequency cannot be controlled. This makes it difficult to realize desired sound insulation characteristics.

Accordingly, it is preferable that the size of the soundproof structure is equal to or less than the wavelength of sound at the first shielding peak frequency.

From the above results, it can be seen that, in order to cause a phase lead at a desired frequency in a region of 1000 Hz or less, in which it is difficult to insulate sound with a sound absorbing member such as urethane, within the audible range of 20 Hz to 20000 Hz, the soundproof structure needs to be smaller than the wavelength 34.5 cm of the sound wave having a frequency of 1000 Hz.

Therefore, the results of examination using computer simulation performed by variously changing the thickness of the plate 202 and the diameter of the hole 204 with the diameter φ of the acoustic tube 200 as 30 cm will be described.

FIGS. 9A to 9F and 10A to 10F show the calculation results.

FIGS. 9A to 9F are graphs showing the relationship between the frequency and the transmission phase difference in a case where the thickness of the plate 202 is set to 1 mm, 5 mm, 10 mm, 25 mm, 50 mm, and 100 mm, respectively, and show the results of calculation in a case where the diameter of the hole 204 is 220 mm, 230 mm, and 240 mm.

FIGS. 10A to 10F are graphs showing the relationship between the frequency and the transmission phase difference in a case where the thickness of the plate 202 is set to 1 mm, 5 mm, 10 mm, 25 mm, 50 mm, and 100 mm, respectively, and show the results of calculation in a case where the diameter of the hole 204 is 150 mm, 160 mm, 170 mm, and 180 mm.

From the calculation results shown in FIGS. 9A to 9F and 10A to 10F, it can be seen that, in the case of the size of the soundproof structure (diameter φ of the acoustic tube 200) and the thickness of the plate 202, the diameter of the hole 204 (that is, the opening diameter of the first through-hole 22) needs to be less than 230 mm in order to cause a phase lead of 20° or more and the diameter of the hole 204 needs to be less than 170 mm in order to cause a phase lead of 55° or more.

Similarly, in order to cause a phase lead of 20° or more at a desired frequency in a region around 3000 Hz or lower, in which the human auditory sensitivity is the highest, within the audible range of 20 Hz to 20000 Hz, the soundproof structure needs to be smaller than the wavelength 11.5 cm of the sound wave having a frequency of 3000 Hz.

Therefore, simulation similar to the above-described computer simulation was performed by variously changing the thickness of the plate 202 and the diameter of the hole 204 with the diameter φ of the acoustic tube 200 as 10 cm. As a result, it was found that the diameter of the hole 204 needed to be less than 74 mm in order to cause a phase lead of 20° or more and the diameter of the hole 204 needed to be less than 56 mm in order to cause a phase lead of 55° or more.

In addition, in order to cause a phase lead of 20° or more at a desired frequency in a region around 10000 Hz or lower within the audible range of 20 Hz to 20000 Hz, the soundproof structure needs to be smaller than the wavelength 3.45 cm of the sound wave having a frequency of 10000 Hz.

Therefore, simulation similar to the above-described computer simulation was performed by variously changing the thickness of the plate 202 and the diameter of the hole 204 with the diameter φ of the acoustic tube 200 as 3 cm. As a result, it was found that the diameter of the hole 204 needed to be less than 21 mm in order to cause a phase lead of 20° or more and the diameter of the hole 204 needed to be less than 14 mm in order to cause a phase lead of 55° or more.

Thus, it can be seen that sound insulation can be performed more appropriately by setting the size of the soundproof structure to a size equal to or less than the wavelength of sound at a shielding target frequency.

In the soundproof structure of the present invention, a sound absorbing material, an odor eliminating material, or the like may be disposed inside the first through-hole 22 of the first soundproof cell 12.

Figure 11:
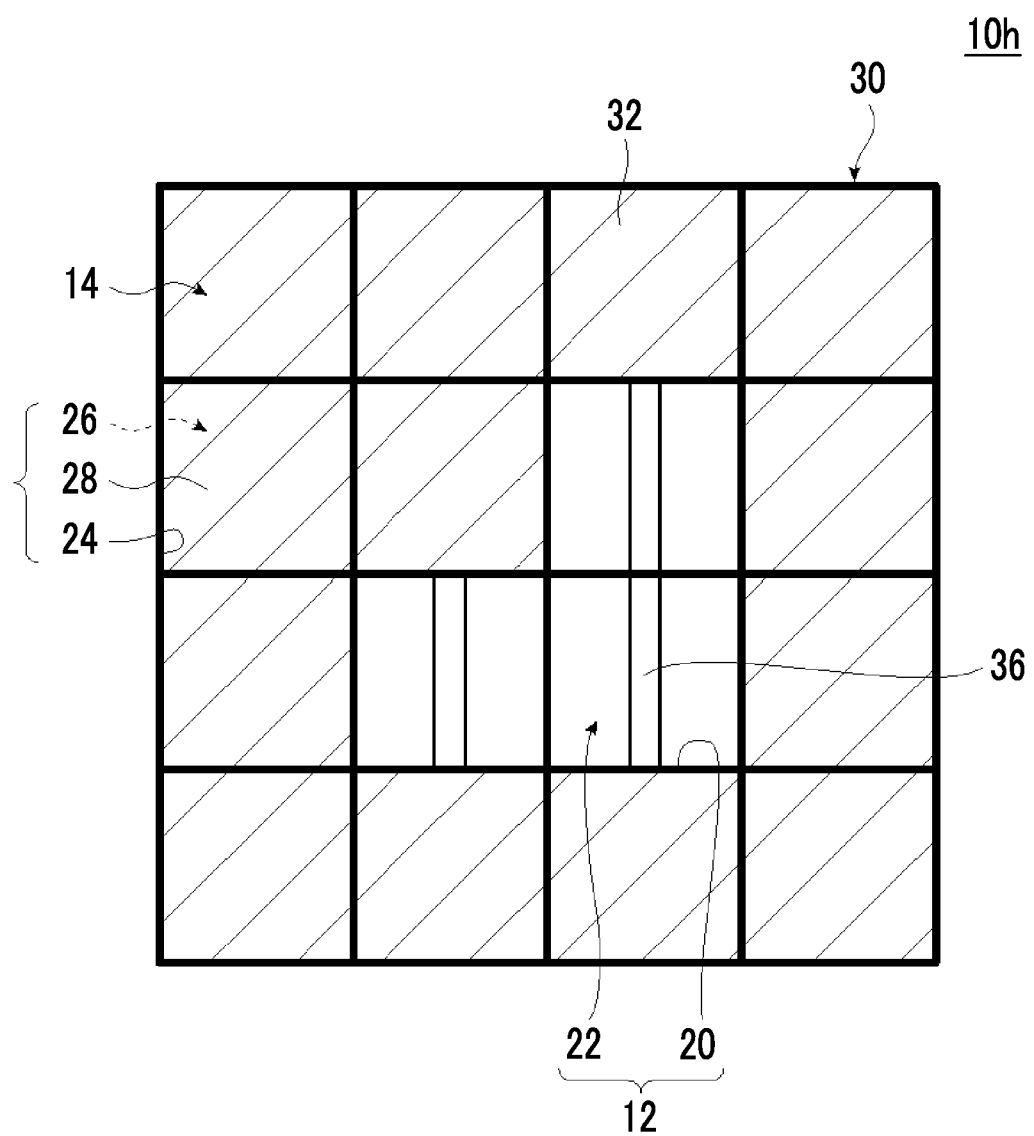
FIG. 11 is a cross-sectional view schematically showing another example of the soundproof structure according to the present invention.

A soundproof structure 10h shown in FIG. 11 has the frame body 30, which has 16 through-holes, and three first soundproof cells 12 and 13 through-holes that are formed by the film body 32 covering 13 second soundproof cells 14 among the through-holes. A sound absorbing material 36 is disposed in each of the first through-holes 22 of the three first soundproof cells 12. In the illustrated example, the sound absorbing material 36 is disposed so as not to block the entire first through-hole 22.

By arranging the sound absorbing material 36, the sound insulation characteristics can be further improved by the sound absorption effect of the sound absorbing material 36.

The sound absorbing material 36 is not particularly limited, and various known sound absorbing materials, such as a urethane plate and a nonwoven fabric, can be used.

Figure 12:
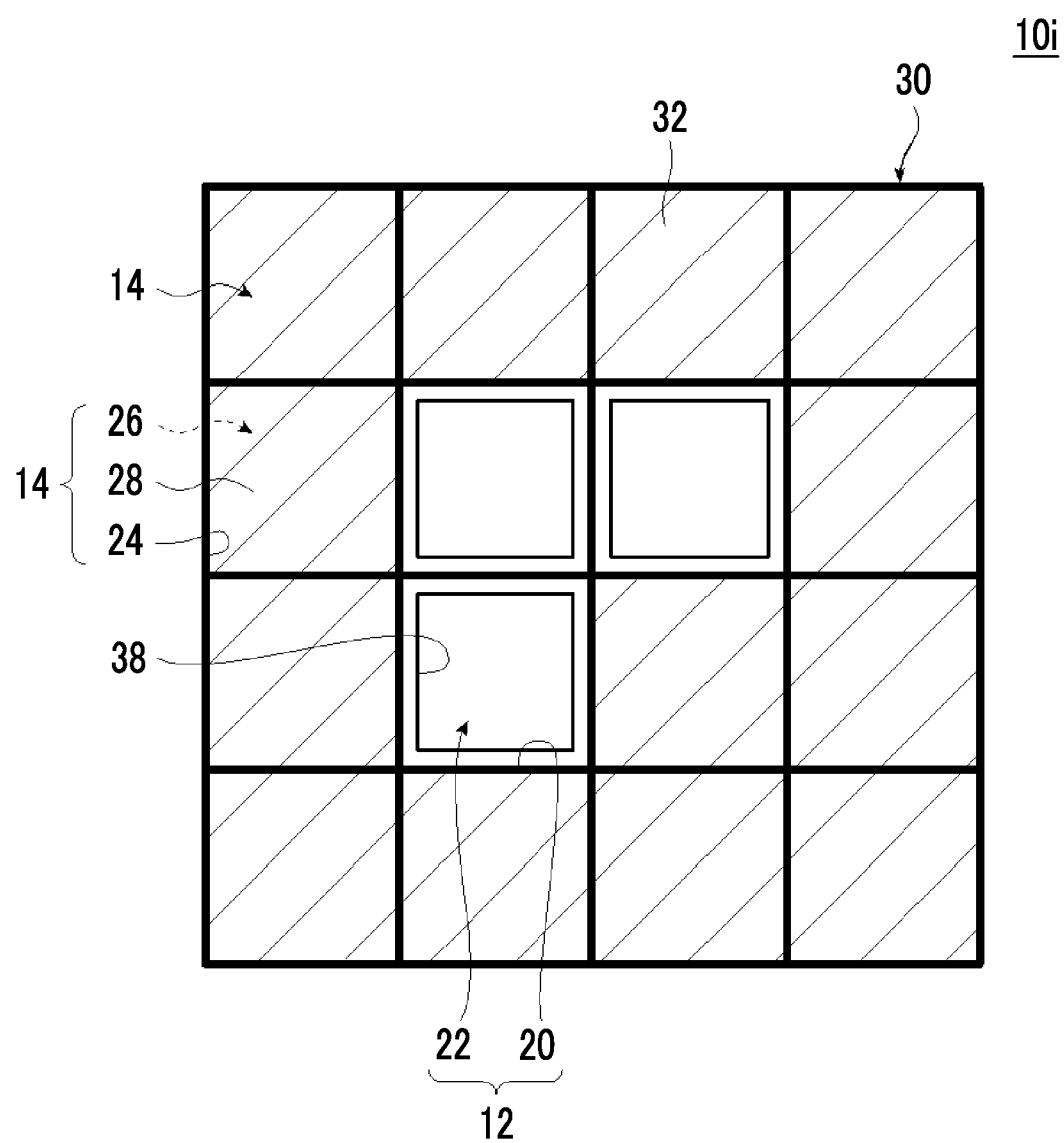
FIG. 12 is a cross-sectional view schematically showing another example of the soundproof structure according to the present invention.

A soundproof structure 10i shown in FIG. 12 has three first soundproof cells 12 and 13 second soundproof cells 14 similarly to the soundproof structure 10h. In the soundproof structure 10i, an odor eliminating material 38 is disposed in each of the first through-holes 22 of the three first soundproof cells 12. In the illustrated example, the odor eliminating material 38 is disposed along the inner side of the first frame 20, and is disposed so as not to block the entire first through-hole 22.

By arranging the odor eliminating material 38, odor can be reduced by the odor absorbing effect of the odor eliminating material 38 in a case where the soundproofing target (noise source) generates odor.

The odor eliminating material 38 is not particularly limited, and various known odor eliminating materials, such as a deodorant sheet containing activated carbon (for example, a semi-deodorant sheet: manufactured by Asahi Kasei Fibers Corporation) and a deodorant sheet using a catalyst (for example, Dynoch film: manufactured by 3M Co.), can be used.

In the soundproof structure of the present invention, the first through-hole 22 of the first soundproof cell 12 may be covered with a member through which sound can pass as an acoustic wave.

For soundproofing in the soundproof structure of the present invention, it is important that both a through-hole through which sound can pass not as vibration but as an acoustic wave and a film through which sound can pass as film vibration are present. Therefore, even in a state in which the through-hole through which sound can pass is covered with a member allowing sound to pass therethrough as an acoustic wave, it is possible to obtain a peak of sound insulation similarly to the case where the through-hole is open. Such a member is a generally air-permeable member.

As a representative example of such a member having air permeability, a mesh net can be mentioned. As an example, an Amidology 30 mesh product manufactured by NBC Meshtec Inc. can be mentioned. However, the present inventors have confirmed that even if the first through-hole is closed by this, the obtained spectrum does not change.

The net may have a lattice form or a triangular lattice form. In particular, since the net does not depend on its shape, there is no limitation on the net.

The size of the entire net may be a size covering the first through-hole 22 of the first soundproof cell 12, or may be a size covering the entire frame body.

In addition, the net may be a net whose mesh has a size intended for so-called insect repelling, or may be a net that prevents the entry of more fine sand. The material may be a net formed of a synthetic resin, or may be a wire for crime prevention or radio wave shielding.

In addition, the above-described air-permeable member is not limited to the mesh net. In addition to the net, a nonwoven fabric material, a urethane material, Synthrate (manufactured by 3M Co.), Breath Air (manufactured by Toyobo Co., Ltd.), Dot Air (manufactured by Toray Industries, Inc.), and the like can be mentioned. In the present invention, by covering the first through-hole with such a material having air permeability, it is possible to prevent insects or sand from passing through the hole, to ensure the privacy such that the inside cannot be seen through the hole portion, and to ensure hiding.

Next, an example of a soundproof structure manufacturing method of the present invention will be described.

First, the frame body 30 having a plurality of through-holes, for example, 225 through-holes, and the sheet-shaped film body 32 covering all the through-holes of the frame body 30 are prepared.

Then, the sheet-shaped film body 32 is fixed to all the frames (frame portion) of the frame body 30 with an adhesive to form the film 28 that covers all the through-holes, thereby forming a plurality of second soundproof cells 14 having a structure configured to include the second frame 24 and the film 28.

Then, in a soundproof cell located at a predetermined position among the plurality of second soundproof cells 14, the through-holes are exposed by removing the film 28 using a processing method for absorbing energy, such as laser processing, or a mechanical processing method based on physical contact, such as a cutter, thereby forming the first soundproof cell 12.

In this manner, it is possible to manufacture the soundproof structure 10 of the present invention.

Next, devices using the soundproof structure of the present invention will be described.

As described above, as soundproofing targets to which the soundproof structure of the present invention is applied, a copying machine, a blower, air conditioning equipment, a ventilator, a pump, a generator, a duct, industrial equipment including various kinds of manufacturing equipment capable of emitting sound such as a coating machine, a rotary machine, and a conveyor machine, transportation equipment such as an automobile, a train, and aircraft, general household equipment such as a refrigerator, a washing machine, a dryer, a television, a copying machine, a microwave oven, a game machine, an air conditioner, a fan, a PC, a vacuum cleaner, an air purifier, and a ventilator, or a partition can be mentioned.

Figure 13:
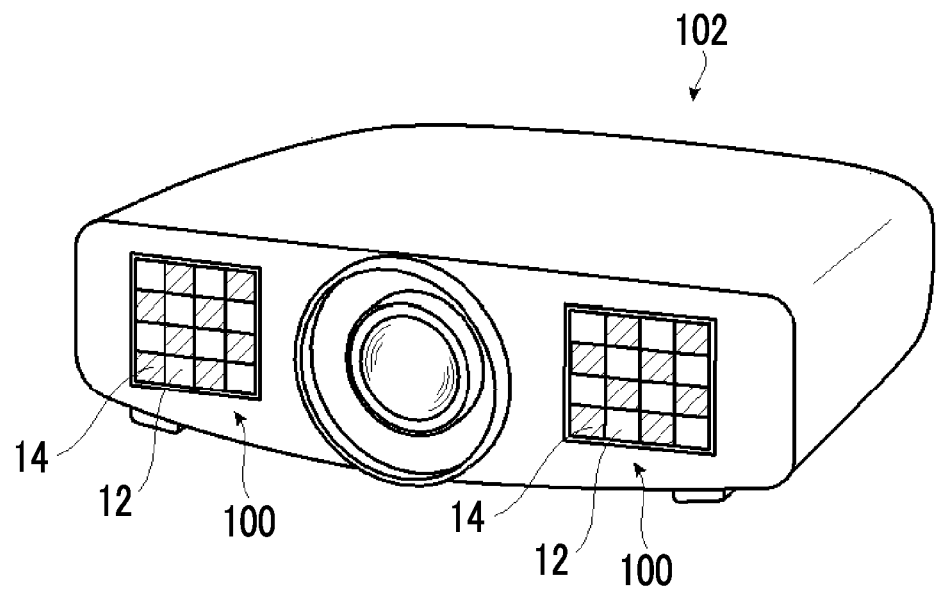
FIG. 13 is a schematic perspective view showing an example of an apparatus having a louver using the soundproof structure of the present invention.

As an example, a projector 102 shown in FIG. 13 has a fan (not shown) for cooling a power supply or the like inside the main body, and the soundproof structure of the present invention is used as a louver 100 disposed in the exhaust (heat exhaust) portion.

Thus, by using the soundproof structure of the present invention as a louver in various devices having a fan, it is possible to appropriately shield sound generated from the fan while appropriately cooling the power supply or the like by ensuring air permeability.

Figure 14:
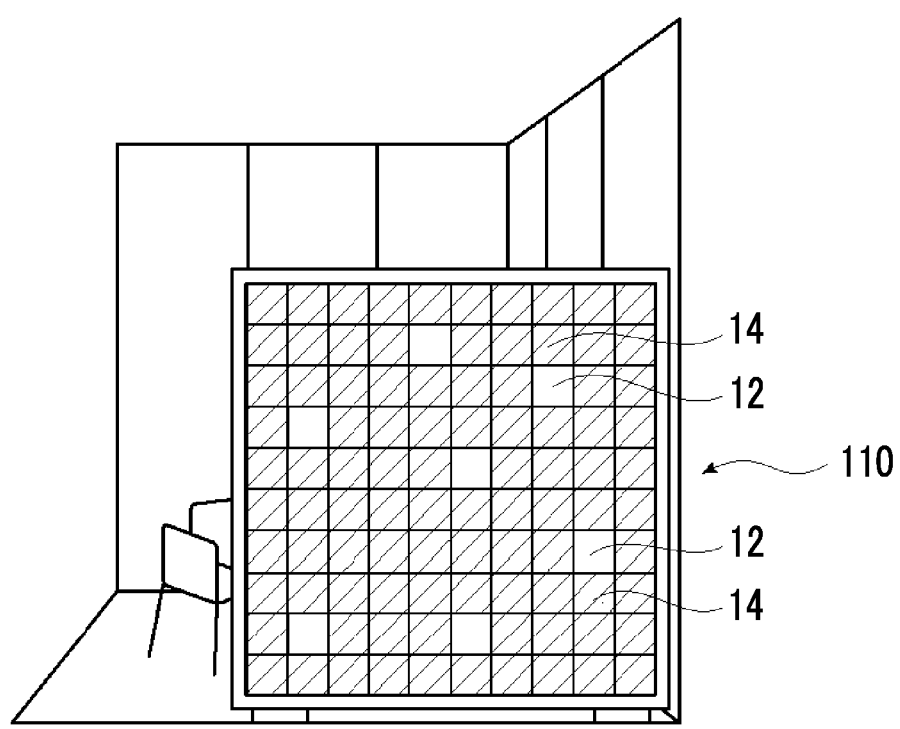
FIG. 14 is a schematic diagram showing an example of a partition using the soundproof structure of the present invention.

A partition 110 shown in FIG. 14 is a screen mainly partitioning a space indoors. As shown in FIG. 14, the entire surface is formed by the soundproof structure of the present invention.

Thus, by using the soundproof structure of the present invention as a partition, it is possible to appropriately shield sound between the partitioned spaces. In particular, in the case of a movable partition, the thin and light structure of the present invention is advantageous in that the structure is easy to carry.

In a case where the soundproof structure of the present invention is used for soundproofing of soundproofing targets as described above, a plurality of soundproof structures may be used in combination. For example, a plurality of soundproof structures may be arranged in a two-dimensional manner in a plane direction in which soundproof cells are arranged.

In a case where a plurality of soundproof structures are used, a plurality of soundproof structures having the same first shielding peak frequency may be used, or a plurality of soundproof structures having different first shielding peak frequencies may be used.

Hereinafter, the physical properties or characteristics of a structural member that can be combined with a soundproof member having the soundproof structure of the present invention will be described

[Flame Retardancy]

In the case of using a soundproof member having the soundproof structure of the present invention as a soundproof material in a building or a device, flame retardancy is required.

Therefore, the film is preferably flame retardant. As the film, for example, Lumirror (registered trademark) nonhalogen flame-retardant type ZV series (manufactured by Toray Industries, Inc.) that is a flame-retardant PET film, Teijin Tetoron (registered trademark) UF (manufactured by Teijin Ltd.), and/or Dialamy (registered trademark) (manufactured by Mitsubishi Plastics Co., Ltd.) that is a flame-retardant polyester film may be used.

The frame is also preferably a flame-retardant material. A metal such as aluminum, an inorganic material such as semilac, a glass material, flame-retardant polycarbonate (for example, PCMUPY 610 (manufactured by Takiron Co., Ltd.)), and/or flame-retardant plastics such as flame-retardant acrylic (for example, Acrylite (registered trademark) FR1 (manufactured by Mitsubishi Rayon Co., Ltd.)) can be mentioned.

As a method of fixing the film to the frame, a bonding method using a flame-retardant adhesive (Three Bond 1537 series (manufactured by Three Bond Co. Ltd.)) or solder or a mechanical fixing method, such as interposing a film between two frames so as to be fixed therebetween, is preferable.

[Heat Resistance]

There is a concern that the soundproofing characteristics may be changed due to the expansion and contraction of the structural member of the soundproof structure of the present invention due to an environmental temperature change. Therefore, the material forming the structural member is preferably a heat resistant material, particularly a material having low heat shrinkage.

As the film, for example, Teijin Tetoron (registered trademark) film SLA (manufactured by Teijin DuPont), PEN film Teonex (registered trademark) (manufactured by Teijin DuPont), and/or Lumirror (registered trademark) off-anneal low shrinkage type (manufactured by Toray Industries, Inc.) are preferably used. In general, it is preferable to use a metal film, such as aluminum having a smaller coefficient of thermal expansion than a plastic material.

As the frame, it is preferable to use heat resistant plastics, such as polyimide resin (TECASINT 4111 (manufactured by Enzinger Japan Co., Ltd.)) and/or glass fiber reinforced resin (TECAPEEKGF 30 (manufactured by Enzinger Japan Co., Ltd.)) and/or to use a metal such as aluminum, an inorganic material such as ceramic, or a glass material.

As the adhesive, it is preferable to use a heat resistant adhesive (TB 3732 (Three Bond Co., Ltd.), super heat resistant one component shrinkable RTV silicone adhesive sealing material (manufactured by Momentive Performance Materials Japan Ltd.) and/or heat resistant inorganic adhesive Aron Ceramic (registered trademark) (manufactured by Toagosei Co., Ltd.)). In the case of applying these adhesives to a film or a frame, it is preferable to set the thickness to 1 µm or less so that the amount of expansion and contraction can be reduced.

[Weather Resistance and Light Resistance]

In a case where the soundproof member having the soundproof structure of the present invention is disposed outdoors or in a place where light is incident, the weather resistance of the structural member becomes a problem.

Therefore, as a film, it is preferable to use a weather-resistant film, such as a special polyolefin film (ARTPLY (trademark) (manufactured by Mitsubishi Plastics Inc.)), an acrylic resin film (ACRYPRENE (manufactured by Mitsubishi Rayon Co.)), and/or Scotch Calfilm (trademark) (manufactured by 3M Co.).

As a frame member, it is preferable to use plastics having high weather resistance such as polyvinyl chloride, polymethyl methacryl (acryl), metal such as aluminum, inorganic materials such as ceramics, and/or glass materials.

As an adhesive, it is preferable to use epoxy resin based adhesives and/or highly weather-resistant adhesives such as Dry Flex (manufactured by Repair Care International).

Regarding moisture resistance as well, it is preferable to appropriately select a film, a frame, and an adhesive having high moisture resistance. Regarding water absorption and chemical resistance, it is preferable to appropriately select an appropriate film, frame, and adhesive.

[Dust]

During long-term use, dust may adhere to the film surface to affect the soundproofing characteristics of the soundproof structure of the present invention. Therefore, it is preferable to prevent the adhesion of dust or to remove adhering dust.

As a method of preventing dust, it is preferable to use a film formed of a material to which dust is hard to adhere. For example, by using a conductive film (Flecria (registered trademark) (manufactured by TDK Corporation) and/or NCF (Nagaoka Sangyou Co., Ltd.)) so that the film is not charged, it is possible to prevent adhesion of dust due to charging. It is also possible to suppress the adhesion of dust by using a fluororesin film (Dynoch Film (trademark) (manufactured by 3M Co.)), and/or a hydrophilic film (Miraclain (manufactured by Lifegard Co.)), RIVEX (manufactured by Riken Technology Inc.) and/or SH2CLHF (manufactured by 3M Co.)). By using a photocatalytic film (Raceline (manufactured by Kimoto Corporation)), contamination of the film can also be prevented. A similar effect can also be obtained by applying a spray having the conductivity, hydrophilic property and/or photocatalytic property and/or a spray containing a fluorine compound to the film.

In addition to using the above special films, it is also possible to prevent contamination by providing a cover on the film. As the cover, it is possible to use a thin film material (Saran Wrap (registered trademark) or the like), a mesh having a mesh size not allowing dust to pass therethrough, a nonwoven fabric, a urethane, an airgel, a porous film, and the like.

Figure 19:
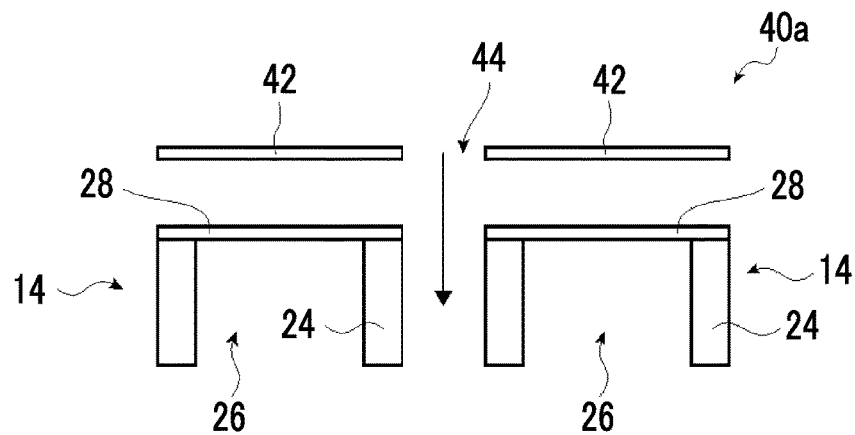
FIG. 19 is a schematic cross-sectional view of an example of a soundproof member having the soundproof structure of the present invention.
Figure 20:
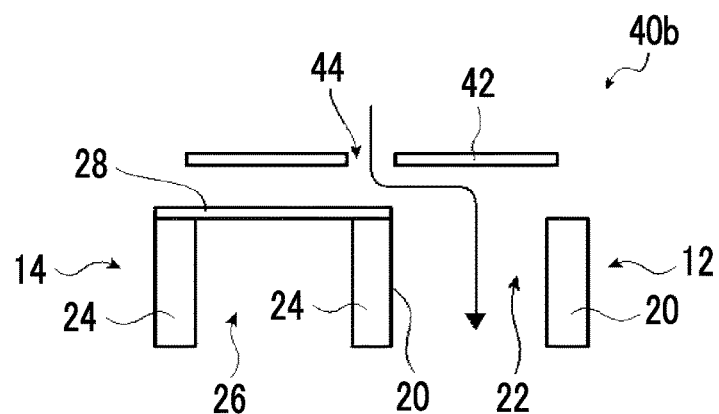
FIG. 20 is a schematic cross-sectional view of another example of the soundproof member having the soundproof structure of the present invention.

As in the present invention, the opening surface of the second through-hole 26 of the second frame 24 of the second soundproof cell 14 is covered with the film 28, but the opening surface of the first through-hole 22 of the first frame 20 of the first soundproof cell 12 is not covered with the film and remains open. Therefore, as in soundproof members 40a and 40b shown in FIGS. 19 and 20, it is preferable to perform arrangement by drilling holes 44 in a cover 42 provided on the film 28 so that wind or dust is not in direct contact with the film 28.

As a method of removing adhering dust, it is possible to remove dust by emitting sound having the resonance frequency of a film and strongly vibrating the film. The same effect can be obtained even if a blower or wiping is used.

[Wind Pressure]

In a case where a strong wind hits a film, the film may be pressed to change the resonance frequency. Therefore, by covering the film with a nonwoven fabric, urethane, and/or a film, the influence of wind can be suppressed. Similarly to the case of dust described above, as in the soundproof members 40a and 40b shown in FIGS. 19 and 20, it is preferable to perform arrangement by drilling the holes 44 in the cover 42 provided on the film 28 so that wind is not in direct contact with the film 28.

[Combination of Unit Cells]

The soundproof structures 10 and 10a to 10i of the present invention shown in FIGS. 1 to 6, 11, and 12 are formed by one frame body in which a plurality of frames 24 are continuous. However, the present invention is not limited thereto, and a soundproof structure may be configured to include a first soundproof cell as a unit cell of only one frame and a second soundproof cell as a unit cell having one frame and one film attached thereto. That is, the soundproof member having the soundproof structure of the present invention does not necessarily need to be formed by one continuous frame body, and a soundproof cell configured to include a first soundproof cell having only a frame structure as a unit cell and a second soundproof cell having a frame structure as a unit cell and a film structure attached thereto may be used. Such a unit cell can be used independently, or a plurality of unit cells can be connected and used.

As a method of connecting a plurality of unit cells, as will be described later, a Magic Tape (registered trademark), a magnet, a button, a suction cup, and/or an uneven portion may be attached to a frame body portion so as to be combined therewith, or a plurality of unit cells can be connected using a tape or the like.

[Arrangement]

Figure 21:
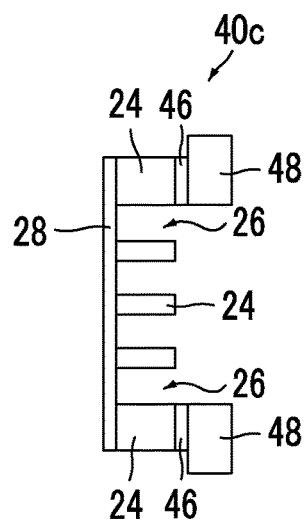
FIG. 21 is a schematic cross-sectional view showing an example of a state in which a soundproof member having the soundproof structure of the present invention is attached to the wall.
Figure 22:
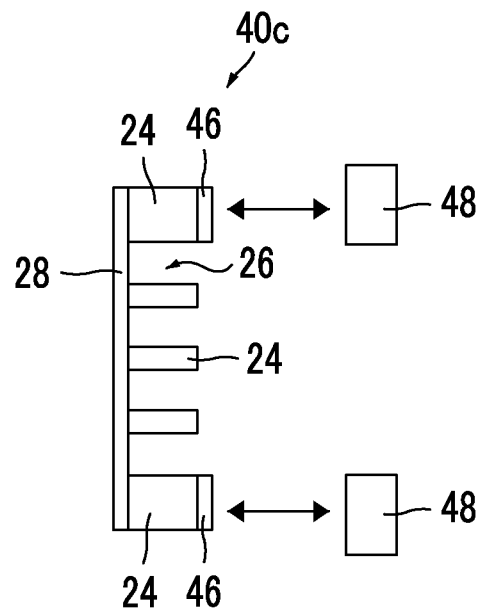
FIG. 22 is a schematic cross-sectional view of an example of a state in which the soundproof member shown in FIG. 21 is detached from the wall.

In order to allow the soundproof member having the soundproof structure of the present invention to be easily attached to a wall or the like or to be removable therefrom, a detaching mechanism formed of a magnetic material, a Magic Tape (registered trademark), a button, a suction cup, or the like is preferably attached to the soundproof member. For example, as shown in FIG. 21, a detaching mechanism 46 may be attached to the bottom surface of the second frame 24 on the outer side of the frame body of a soundproof member 40c, and the detaching mechanism 46 attached to the soundproof member 40c may be attached to a wall 48 so that the soundproof member 40c is attached to the wall 48. As shown in FIG. 22, the detaching mechanism 46 attached to the soundproof member 40c may be detached from the wall 48 so that the soundproof member 40c is detached from the wall 48. In the examples shown in FIGS. 21 to 31, for the sake of simplicity of explanation, the explanation is given using the second soundproof cell 14, which has the second frame 24 and the film 28 covering the opening surface of the second through-hole 26, as a soundproof cell. For this reason, the first soundproof cell 12 having the first frame 20 with the first through-hole 22 is not shown. However, it is needless to say that the first soundproof cell 12 is included in the plurality of second soundproof cells 14.

Figure 23:
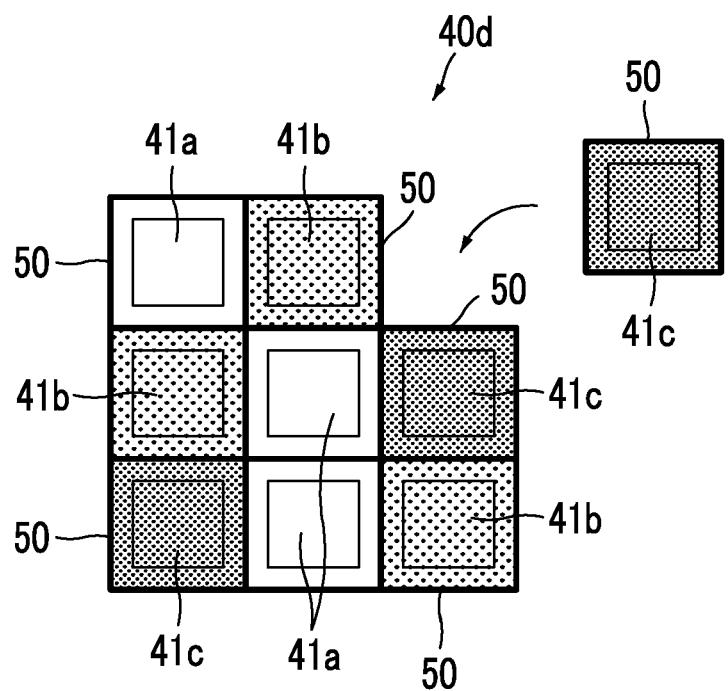
FIG. 23 is a plan view showing attachment and detachment of a unit cell in another example of the soundproof member having the soundproof structure according to the present invention.

In the case of adjusting the soundproofing characteristics of the soundproof member 40d by combining respective soundproof cells having different resonance frequencies, for example, by combining soundproof cells 41a, 41b, and 41c as shown in FIG. 23, it is preferable that the detaching mechanism 50, such as a magnetic material, a Magic Tape (registered trademark), a button, and a suction cup, is attached to each of the soundproof cells 41a, 41b, and 41c so that the soundproof cells 41a, 41b, and 41c are easily combined.

Figure 24:
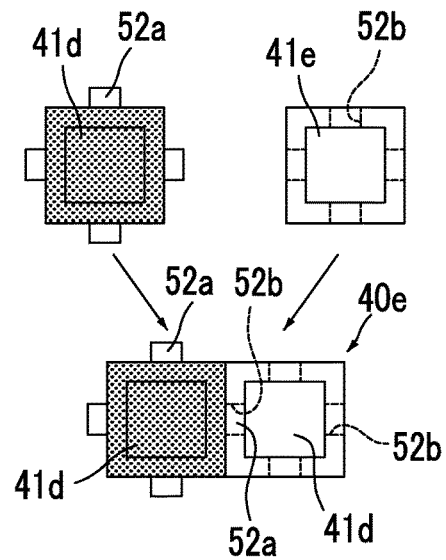
FIG. 24 is a plan view showing attachment and detachment of a unit cell in another example of the soundproof member having the soundproof structure according to the present invention.
Figure 25:
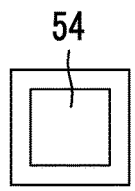
FIG. 25 is a plan view of an example of a soundproof cell of the soundproof structure of the present invention.
Figure 26:
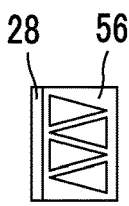
FIG. 26 is a side view of the soundproof cell shown in FIG. 25.
Figure 27:
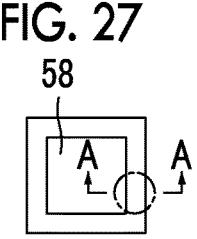
FIG. 27 is a plan view of an example of a soundproof cell of the soundproof structure of the present invention.
Figure 28:
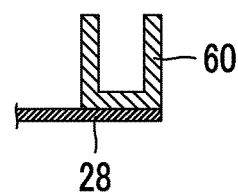
FIG. 28 is a schematic cross-sectional view of the soundproof cell shown in FIG. 27 as viewed from the arrow A-A.

In addition, an uneven portion may be provided in a soundproof cell. For example, as shown in FIG. 24, a protruding portion 52a may be provided in a soundproof cell 41d and a recessed portion 52b may be provided in a soundproof cell 41e, and the protruding portion 52a and the recessed portion 52b may be engaged so that the soundproof cell 41d and the soundproof cell 41e are detached from each other. As long as it is possible to combine a plurality of soundproof cells, both a protruding portion and a recessed portion may be provided in one soundproof cell.

Furthermore, the soundproof cells may be detached from each other by combining the above-described detaching mechanism 50 shown in FIG. 23 and the uneven portion, the protruding portion 52a, and the recessed portion 52b shown in FIG. 24.

[Mechanical Strength of Frame]

As the size of the soundproof member having the soundproof structure of the present invention increases, the frame easily vibrates, and a function as a fixed end with respect to film vibration is degraded. Therefore, it is preferable to increase the frame stiffness by increasing the thickness of the frame. However, increasing the thickness of the frame causes an increase in the mass of the soundproof member. This declines the advantage of the present soundproof member that is lightweight.

Therefore, in order to reduce the increase in mass while maintaining high stiffness, it is preferable to form a hole or a groove in the frame. For example, by using a truss structure as shown in a side view of FIG. 26 for a frame 56 of a soundproof cell 54 shown in FIG. 25 or by using a Rahmem structure as shown in the A-A arrow view of FIG. 28 for a frame 60 of a soundproof cell 58 shown in FIG. 27, it is possible to achieve both high stiffness and light weight.

Figure 29:
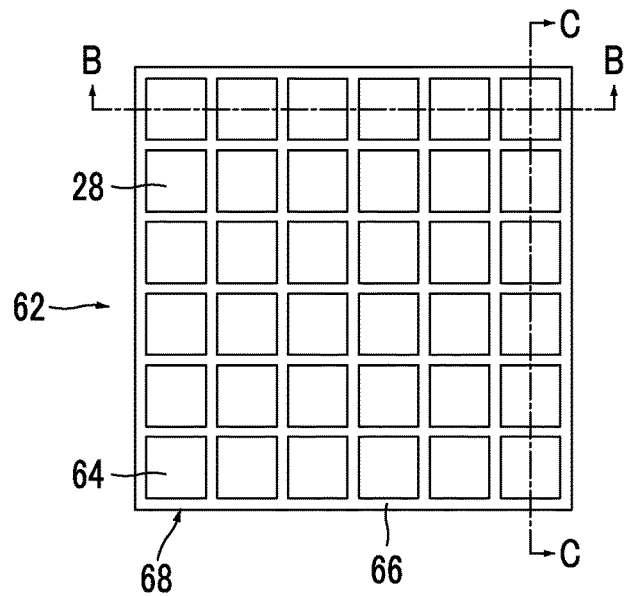
FIG. 29 is a plan view of another example of the soundproof member having the soundproof structure of the present invention.
Figure 30:
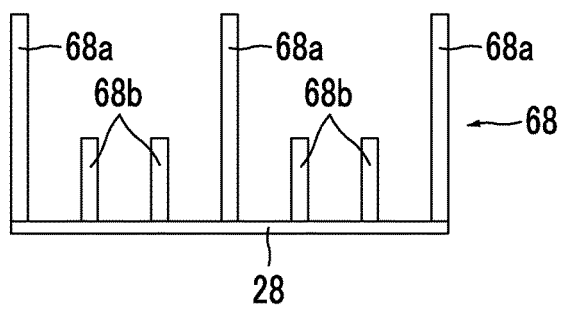
FIG. 30 is a schematic cross-sectional view of the soundproof member shown in FIG. 29 as viewed from the arrow B-B.
Figure 31:
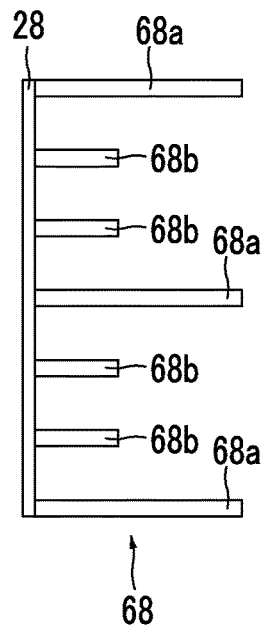
FIG. 31 is a schematic cross-sectional view of the soundproof member shown in FIG. 29 as viewed from the arrow C-C.

For example, as shown in FIGS. 29 to 31, by changing or combining the frame thickness in the plane, it is possible to secure high stiffness and to reduce the weight. As in a soundproof member 62 having the soundproof structure of the present invention shown in FIG. 29, as shown in FIG. 30 that is a schematic cross-sectional view of the soundproof member 62 shown in FIG. 29 taken along the line B-B, frame-shaped members 68a on both outer sides and a central frame-shaped member 68a of a frame body 68 configured to include a plurality of frames 66 of 36 soundproof cells 64 are made thicker than frame-shaped members 68b of the other portions. In the illustrated example, the frame-shaped members 68a on both outer sides and the central frame-shaped member 68a are made two times or more thicker than the frame-shaped members 68b of the other portions. As shown in FIG. 31 that is a schematic cross-sectional view taken along the line C-C perpendicular to the line B-B, similarly in the direction perpendicular to the line B-B, the frame-shaped members 68a on both outer sides and the central frame-shaped member 68a of the frame body 68 are made thicker than the frame-shaped members 68b of the other portions. In the illustrated example, the frame-shaped members 68a on both outer sides and the central frame-shaped member 68a are made two times or more thicker than the frame-shaped members 68b of the other portions.

In this manner, it is possible to achieve both high stiffness and light weight.

The soundproof structure of the present invention can be used as the following soundproof members.

For example, as soundproof members having the soundproof structure of the present invention, it is possible to mention: a soundproof member for building materials (soundproof member used as building materials); a soundproof member for air conditioning equipment (soundproof member installed in ventilation openings, air conditioning ducts, and the like to prevent external noise); a soundproof member for external opening portion (soundproof member installed in the window of a room to prevent noise from indoor or outdoor); a soundproof member for ceiling (soundproof member installed on the ceiling of a room to control the sound in the room); a soundproof member for internal opening portion (soundproof member installed in a portion of the inside door or sliding door to prevent noise from each room); a soundproof member for toilet (soundproof member installed in a toilet or a door (indoor and outdoor) portion to prevent noise from the toilet); a soundproof member for balcony (soundproof member installed on the balcony to prevent noise from the balcony or the adjacent balcony); an indoor sound adjusting member (soundproof member for controlling the sound of the room); a simple soundproof chamber member (soundproof member that can be easily assembled and can be easily moved); a soundproof chamber member for pet (soundproof member that surrounds a pet's room to prevent noise); amusement facilities (soundproof member installed in a game centers, a sports center, a concert hall, and a movie theater); a soundproof member for temporary enclosure for construction site (soundproof member for preventing leakage of a lot of noise around the construction site); and a soundproof member for tunnel (soundproof member installed in a tunnel to prevent noise leaking to the inside and outside the tunnel).

EXAMPLES

The soundproof structure of the present invention will be specifically described by way of examples, but the present invention is not limited thereto.

Example 1

As Example 1, the soundproof structure 10 having one first soundproof cell 12 and fifteen second soundproof cells 14 as shown in FIG. 1 was manufactured.

Specifically, in the soundproof structure 10, a PET film (Lumirror manufactured by Toray Industries, Inc.) having a thickness of 50 μm as the film body 32 is bonded to the frame body 30 formed of aluminum, in which 16 through-holes of 15 mm square are drilled in a lattice pattern of 4×4, and a region of the PET film corresponding to one through-hole is cut out.

A cut region of the PET film (that is, the position of the first soundproof cell 12) was one of the inner through-holes. Cutting of the film was performed using a cutter.

The thickness of the frame body 30 was 18 mm, and the width of the frame was 2 mm.

The frame body 30 and the film body 32 were bonded to each other with a double-sided tape.

Example 2

The soundproof structure 10 was manufactured in the same manner as in Example 1 except that the number of first soundproof cells 12 was two.

The position of the first soundproof cell 12 was two diagonally of the inner soundproof cells.

Example 3

The soundproof structure 10 was manufactured in the same manner as in Example 1 except that the number of first soundproof cells 12 was three.

The position of the first soundproof cell 12 was three of the inner soundproof cells.

Comparative Example 1

A soundproof structure was manufactured in the same manner as in Example 1 except that a first soundproof cell was not provided and through-holes of all soundproof cells were covered with the film body.

[Evaluation]

For the manufactured soundproof structures of Examples 1 to 3 and Comparative Example 1, the acoustic characteristics were measured.

The acoustic characteristics were measured by a transfer function method using four microphones in a self-made aluminum acoustic tube. This method is based on "ASTM E2611-09: Standard Test Method for Measurement of Normal Incidence Sound Transmission of Acoustical Materials Based on the Transfer Matrix Method". As the acoustic tube, for example, an acoustic tube based on the same measurement principle as WinZac manufactured by Nitto Bosei Aktien Engineering Co., Ltd. was used. It is possible to measure the sound transmission loss in a wide spectral band using this method.

The soundproof structures of each example and Comparative Example 1 were disposed in a measurement portion of the acoustic tube, and the sound transmission loss was measured in the range of 10 Hz to 40000 Hz. The measurement range was measured by combining a plurality of diameters of acoustic tubes or a plurality of distances between microphones. In general, as the distance between the microphones increases, the amount of measurement noise decreases at low frequencies. On the other hand, in a case where the distance between the microphones is larger than the wavelength/2 on the high frequency side, measurement cannot be performed in principle. Accordingly, measurement was performed multiple times while changing the distance between the microphones. In addition, since the acoustic tube is thick, measurement cannot be performed due to the influence of the higher order mode on the high frequency side. Therefore, measurement was performed using a plurality of types of diameters of the acoustic tube.

Figure 15:
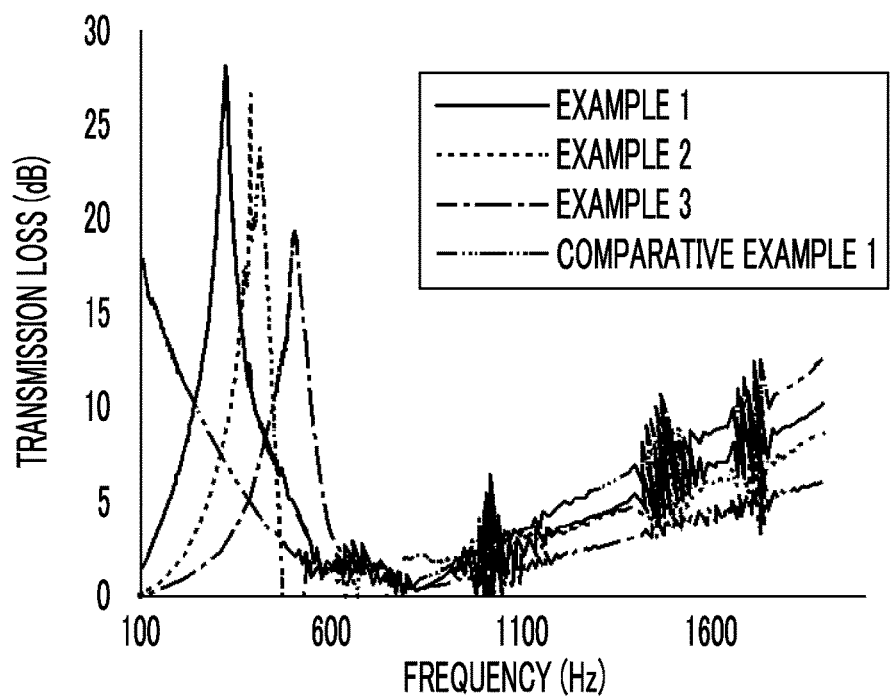
FIG. 15 is a graph showing the relationship between a frequency and a transmission loss in Examples 1 to 3 and Comparative Example 1.

FIG. 15 shows a measurement result of the transmission loss.

As is apparent from the result shown in FIG. 15, in Comparative Example 1 having no first soundproof cell, there is a valley of the transmission loss of the first natural vibration due to the second soundproof cell in the vicinity of 650 Hz. Therefore, shielding by the stiffness law is present on the lower frequency side than the first natural frequency, and shielding by the mass law is present on the higher frequency side than the first natural vibration frequency. However, it can be seen that the transmission loss is not large and the sound insulation characteristics are not sufficient.

In contrast, it can be seen that, in Examples 1 to 3 of the present invention, the first natural vibration frequency is present on the lower frequency side than the first shielding peak frequency by the second soundproof cell. Therefore, an arbitrary desired frequency component can be shielded very strongly.

From the comparison of Examples 1 to 3, it can be seen that the first shielding peak frequency can be adjusted by changing the number of second soundproof cells. In this case, since the value of the first shielding peak frequency does not change extremely depending on the number of second soundproof cells, it can be seen that the robustness is high and the manufacturing suitability is excellent.

Example 4

Next, as Example 4, a soundproof structure 10b having two types of second soundproof cells 14a and 14b as shown in FIG. 3 was manufactured, and the acoustic characteristics were measured.

Specifically, Example 4 was the same as Example 1 except that two types of film bodies 32a and 32b having different thicknesses were used.

A PET film having a thickness of 50 μm was used as the film body 32a, and seven through-holes other than a through-hole used as the first soundproof cell 12 in the right half in FIG. 3 were covered to form seven second soundproof cells 14a. On the other hand, a PET film having a thickness of 100 μm was used as the film body 32b, and eight through-holes in the left half in FIG. 3 were covered to form eight second soundproof cells 14b.

For the manufactured soundproof structure of Example 4, the acoustic characteristics were measured using the same method as described above. The measurement result is shown in FIG. 16.

Figure 16:
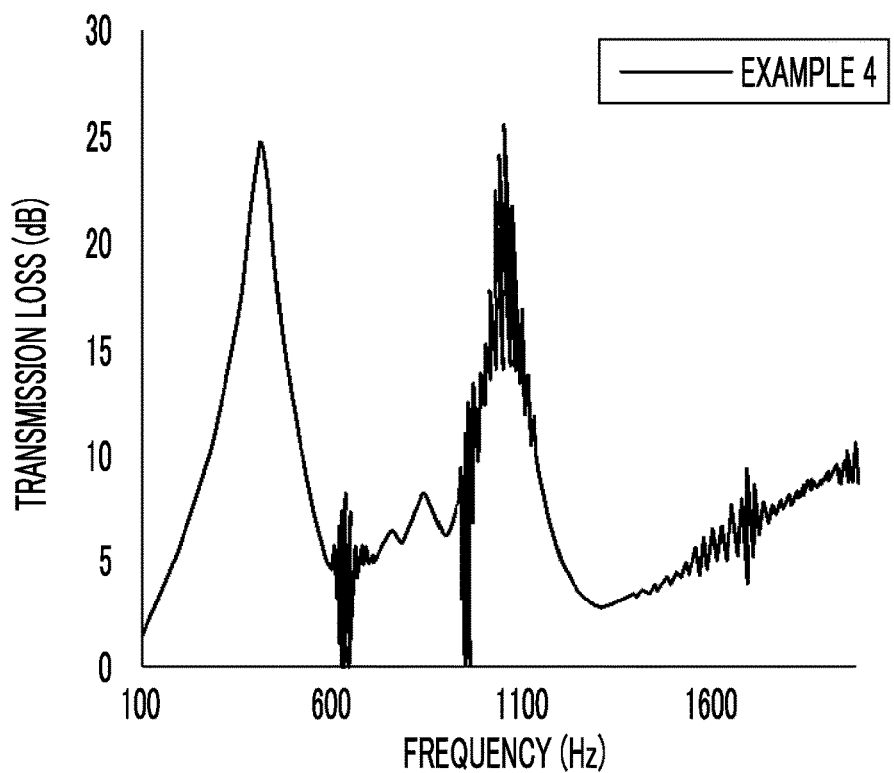
FIG. 16 is a graph showing the relationship between a frequency and a transmission loss in Example 4.

As shown in FIG. 16, by providing two types of second soundproof cells having different first natural vibration frequencies by making the thicknesses of the films of the second soundproof cells different from each other, it can be seen that two first shielding peaks due to the first through-hole of the first soundproof cell are present on the lower frequency side than each first natural vibration frequency.

Thus, it is preferable to be able to obtain a plurality of shielding peaks by providing two or more types of second soundproof cells having different first natural vibration frequencies of the film.

Examples 5 and 6

Next, as Example 5, a soundproof structure 10d in which the film body 32 was disposed on both sides of the frame body 30 as shown in FIG. 6 was manufactured, and the acoustic characteristics were measured.

Specifically, Example 5 was the same as Example 1 except that the thickness of the PET film as the film body 32 was set to 100 μm, the film body 32 was bonded to both surfaces of the frame body 30, and one first soundproof cell was provided by cutting out a region corresponding to one through-hole of both the PET films.

For comparison with Example 5, as Example 6, a soundproof structure was manufactured in the same manner as in Example 5 except that the film body 32 was provided on one surface of the frame body 30, that is, in the same manner as in Example 1 except that the thickness of the PET film was set to 100 μm, and the acoustic characteristics were measured.

For the manufactured soundproof structures of Examples 5 and 6, the acoustic characteristics were measured using the same method as described above. The measurement result is shown in FIG. 17.

Figure 17:
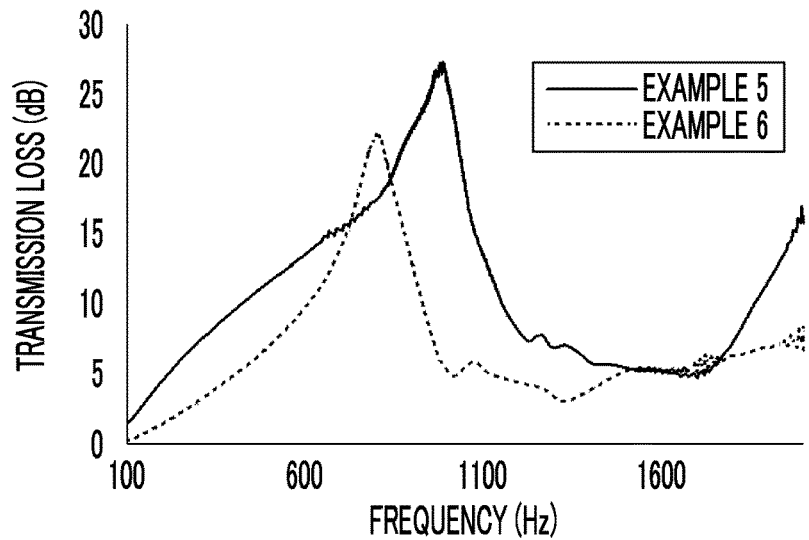
FIG. 17 is a graph showing the relationship between a frequency and a transmission loss in Examples 5 and 6.

As shown in FIG. 17, the transmission loss in Example 5 in which the film of the second soundproof cell is provided on both sides to form two layers is larger than the transmission loss in Example 6 in which the film has one layer. That is, it can be seen that the sound insulation characteristics can be improved by forming the film of the second soundproof cell so as to have multiple layers, which is preferable.

Examples 7 and 8

Next, as Example 7, a soundproof structure 10h having a configuration in which the sound absorbing material 36 was disposed in the first through-hole 22 of the first soundproof cell 12 as shown in FIG. 11 was manufactured, and the acoustic characteristics were measured.

Specifically, Example 7 was the same as Example 3 except that a PET film (Lumirror manufactured by Toray Industries, Inc.) having a thickness of 100 μm was used as the film body 32 and a urethane plate having a thickness of 2 mm as the sound absorbing material 36 was disposed in the first through-holes 22 of the three first soundproof cells 12.

For comparison with Example 7, as Example 8, a soundproof structure was manufactured in the same manner as in Example 7 except that the sound absorbing material 36 was not disposed, that is, in the same manner as in Example 3 except that the thickness of the PET film was set to 100 m, and the acoustic characteristics were measured.

For the manufactured soundproof structures of Examples 7 and 8, the transmission loss was measured using the same method as described above.

The absorbance of sound (energy of sound waves) of the soundproof structures of Examples 7 and 8 was calculated. The measurement method was performed by the transfer function method using the same four microphones as in the above measurement, and the absorbance was calculated from the measured transmittance and reflectivity.

Figure 18A:
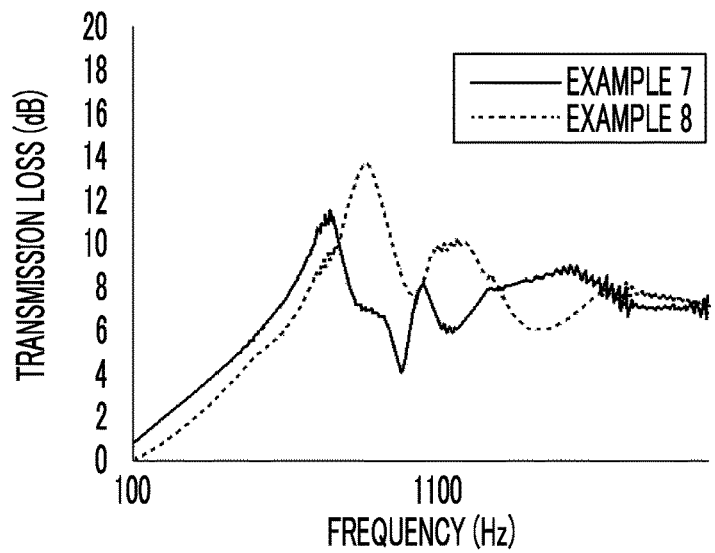
FIG. 18A is a graph showing the relationship between a frequency and a transmission loss in Examples 7 and 8.
Figure 18B:
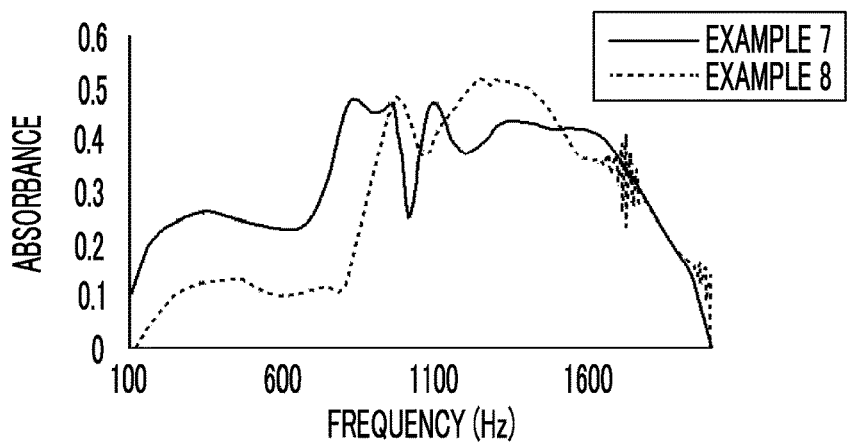
FIG. 18B is a graph showing the relationship between a frequency and an absorbance in Examples 7 and 8.

The measurement results of the transmission loss and the absorbance are shown in FIGS. 18A and 18B.

As shown in FIG. 18A, it can be seen that the first natural vibration frequency is present on the lower frequency side than the first shielding peak frequency even in a case where a sound absorbing material is disposed in the first soundproof cell.

In addition, as shown in FIG. 18B, by arranging the sound absorbing material, the absorbance increases on the lower frequency side than the first shielding peak frequency.

Therefore, it can be seen that the sound insulation characteristics can be enhanced, which is preferable.

While the soundproof structure of the present invention has been described in detail with reference to various embodiments and examples, the present invention is not limited to these embodiments and examples, and various improvements or modifications may be made without departing from the scope and spirit of the present invention.

EXPLANATION OF REFERENCES 10, 10b to 10i: soundproof structure
12, 12b to 12d: first soundproof cell
14, 14a to 14c: second soundproof cell
20, 20b to 20d: first frame
22, 22b to 22d: first through-hole
24: second frame
26: second through-hole
28, 28a, 28b: film
30: frame body
32, 32a, 32b: film body
34: straightening plate
36: sound absorbing material
38: odor eliminating material
40a, 40b, 40c, 40d, 62: soundproof member
41a, 41b, 41c, 41d, 41e, 54, 58, 64: soundproof cell
42: cover
44: hole
46, 50: detaching mechanism
48: wall
52a: protruding portion
52b: recessed portion
56, 60, 66: frame
68a, 68b: plate-shaped member
68: frame body
100: louver
102: projector
110: partition

What is claimed is:
1. A soundproof structure, comprising:
two or more soundproof cells arranged in a two-dimensional manner,
wherein at least one of the soundproof cells is a first soundproof cell configured to include a first frame having a first through-hole, at least one of the other soundproof cells is a second soundproof cell comprising a second frame having a second through-hole and a film fixed to the second frame, and the soundproof structure has a first shielding peak frequency, which is determined by the first through-hole of the first soundproof cell and at which a transmission loss is maximized, on a lower frequency side than a first natural vibration frequency of the film of the second soundproof cell, and selectively insulates sound in a predetermined frequency band centered on the first shielding peak frequency, wherein a mass is not included in the soundproof structure.

2. The soundproof structure according to claim 1, wherein a size of the soundproof structure is equal to or less than a wavelength of sound at the first shielding peak frequency.

3. The soundproof structure according to claim 1, wherein the first natural vibration frequency of the film of the second soundproof cell is determined by a geometric form of the second frame of the second soundproof cell and stiffness of the film, and the first shielding peak frequency is determined according to a path length and an opening diameter of the first through-hole of the first soundproof cell.

4. The soundproof structure according to claim 1, wherein the first natural vibration frequency is included within a range of 10 Hz to 100000 Hz.

5. The soundproof structure according to claim 1, wherein the first soundproof cell causes a phase lead of 20° or more for sound waves transmitted through the first through-hole.

6. The soundproof structure according to claim 1, wherein the two or more second soundproof cells having different first natural vibration frequencies of the film are provided.

7. The soundproof structure according to claim 1, wherein the second soundproof cell has two films fixed to the second frame so as to cover the openings on both sides of the second through-hole.

8. The soundproof structure according to claim 1, wherein a sound absorbing material is disposed in at least one of the first through-holes.

9. The soundproof structure according to claim 1, wherein an odor eliminating material is disposed in at least one of the first through-holes.

10. A louver, comprising:
the soundproof structure according to claim 1.

11. A partition, comprising:
the soundproof structure according to claim 1.

* * * * *